United States Patent
Yagi et al.

[11] Patent Number: 5,927,926
[45] Date of Patent: Jul. 27, 1999

[54] CARRIAGE FOR STORAGE-RETRIEVAL SYSTEM WITH LOCKING-ENGAGING MEMBERS

[75] Inventors: Masato Yagi; Kuniharu Matsuda; Shinichi Murakoshi; Osamu Yamaguchi; Hiroshi Iwamaru, all of Osaka, Japan

[73] Assignee: Itoki Crebio Corporation, Osaka, Japan

[21] Appl. No.: 08/953,534

[22] Filed: Oct. 20, 1997

[30] Foreign Application Priority Data

Oct. 21, 1996 [JP] Japan ................................. 8-278342
Oct. 21, 1996 [JP] Japan ................................. 8-278343

[51] Int. Cl.⁶ .................................................. B65G 1/00
[52] U.S. Cl. ........................ 414/280; 414/274; 414/275; 414/661
[58] Field of Search ................................. 414/280, 277, 414/279, 661, 274, 275; 901/47

[56] References Cited

U.S. PATENT DOCUMENTS

| | | | |
|---|---|---|---|
| 3,892,324 | 7/1975 | Faletti | 414/274 |
| 4,562,551 | 12/1985 | Inaba et al. | 901/47 |
| 4,614,474 | 9/1986 | Sudo | 414/274 |
| 4,932,827 | 6/1990 | Schlunke et al. | 414/661 |
| 5,135,344 | 8/1992 | Kita et al. | 414/280 |
| 5,375,958 | 12/1994 | Kluttermann | 414/280 |
| 5,380,139 | 1/1995 | Pohjonen et al. | 414/280 |
| 5,564,880 | 10/1996 | Lederer | 414/280 |
| 5,602,821 | 2/1997 | McPherson et al. | 414/280 |
| 5,810,540 | 9/1998 | Castaldi | 414/280 |

FOREIGN PATENT DOCUMENTS 6-107305  4/1994  Japan .
7-101508  4/1995  Japan .

*Primary Examiner*—James W. Keenan
*Assistant Examiner*—Isobel A. Parker
*Attorney, Agent, or Firm*—Michael D. Bednarek; Crowell & Moring LLP

[57] ABSTRACT

A carriage is provided for a storage-retrieval system including a shelf assembly. The carriage includes a base member, at least one carrier region above the base member for supporting an object to be transferred, at least one pair of shifting units flanking the carrier region. The shifting units are reciprocally movable into and away from the shelf assembly. Engaging members are mounted on the shifting units. Each of the engaging members arranged to pivot about a vertical axis and movable between a closed position for contacting the object and an open position for avoiding the contacting with the object.

12 Claims, 21 Drawing Sheets

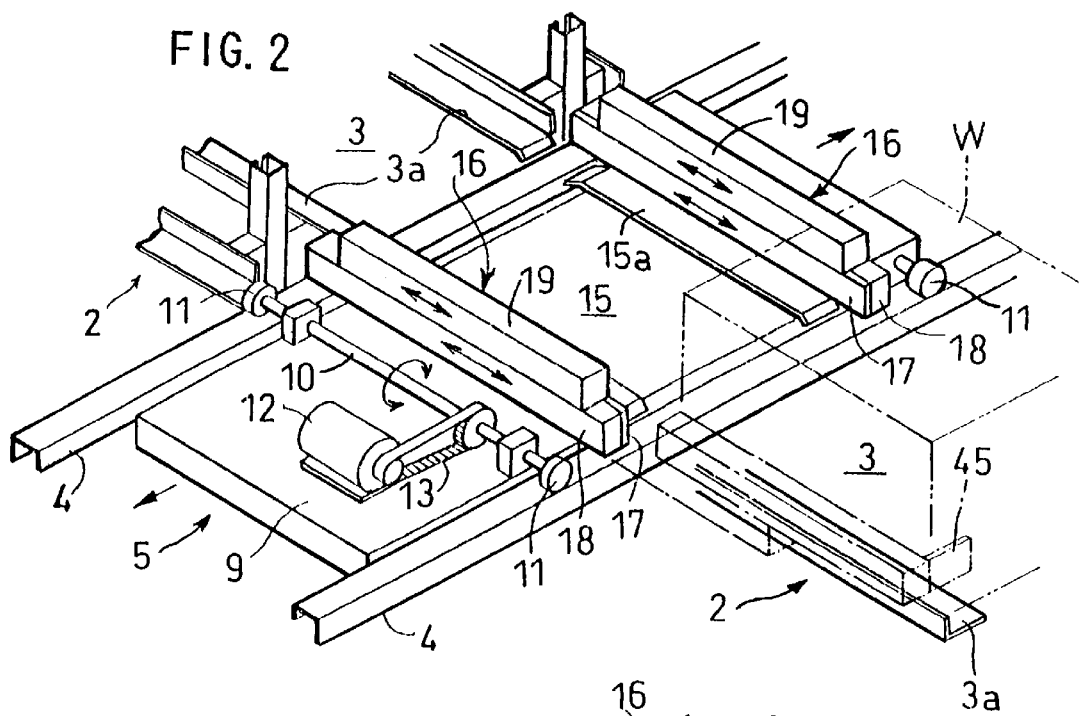
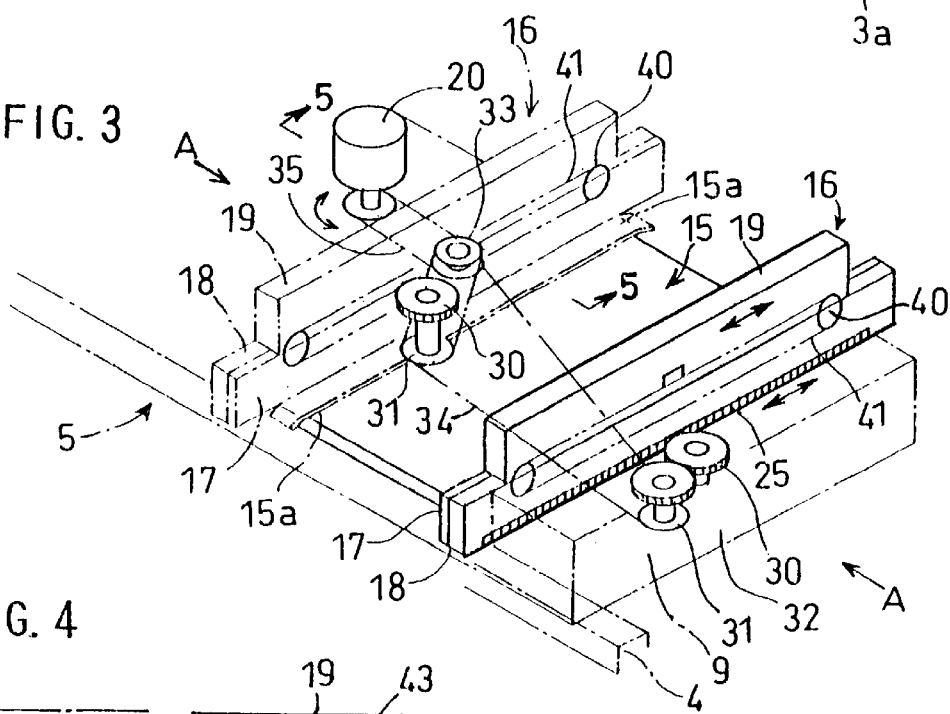
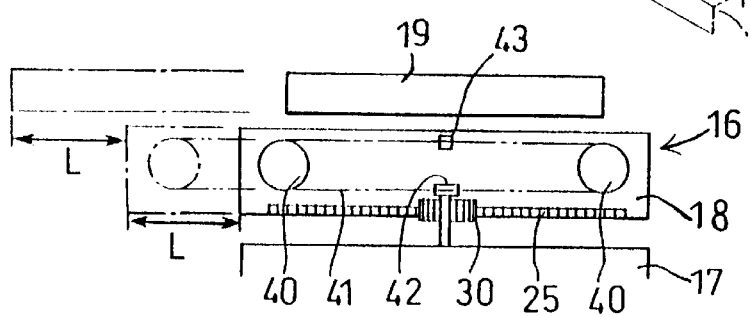

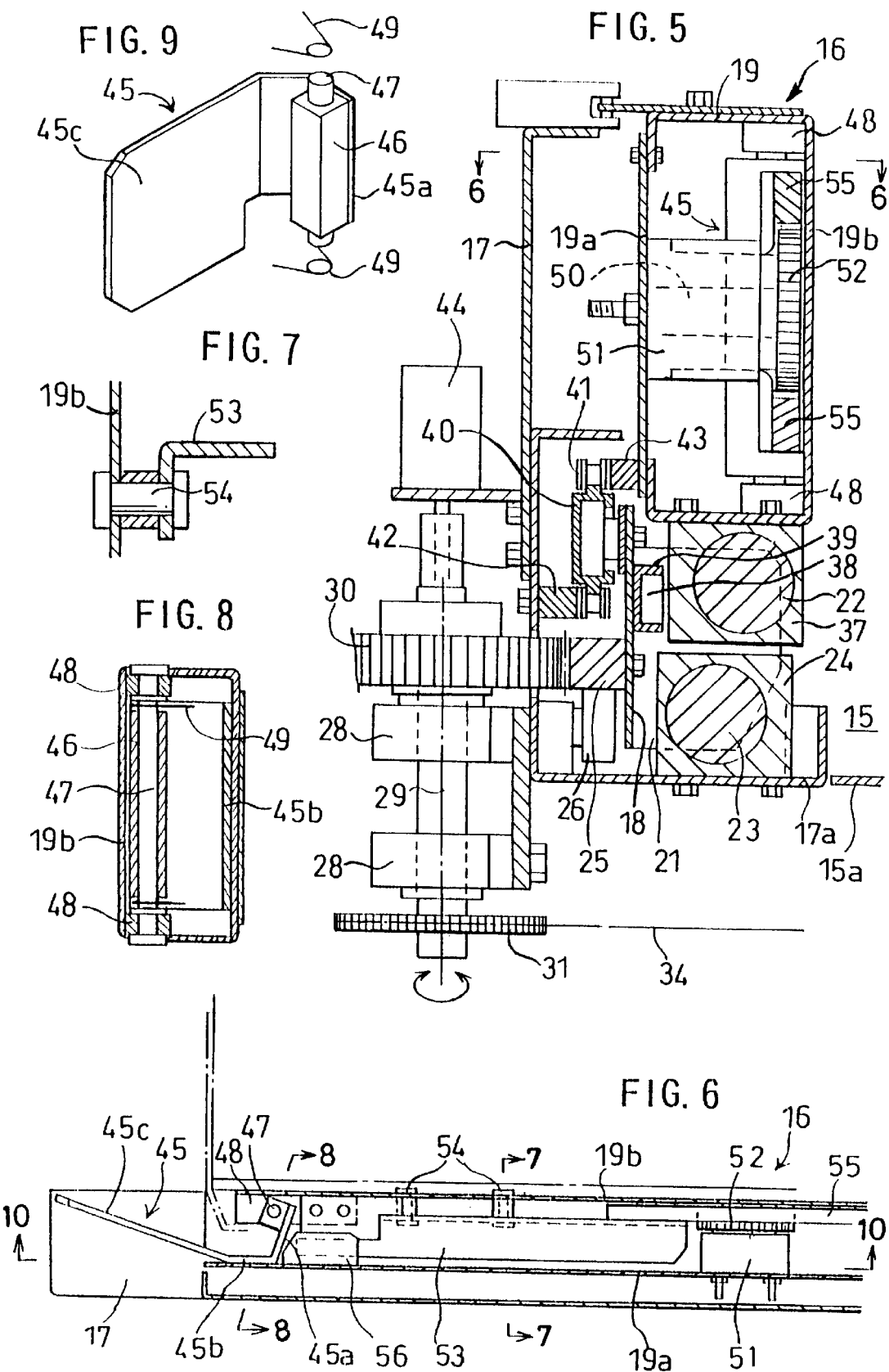

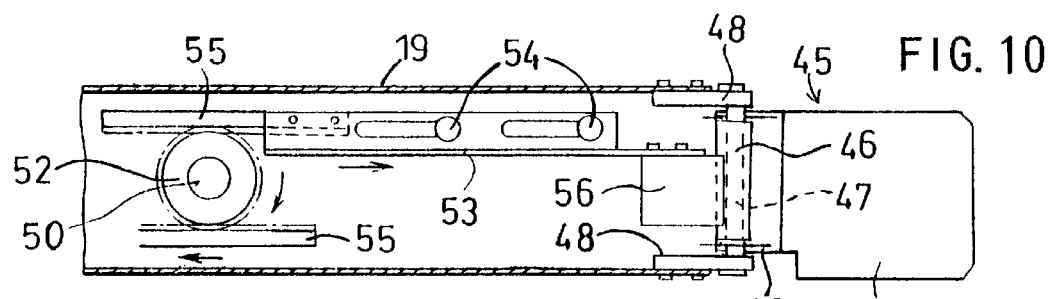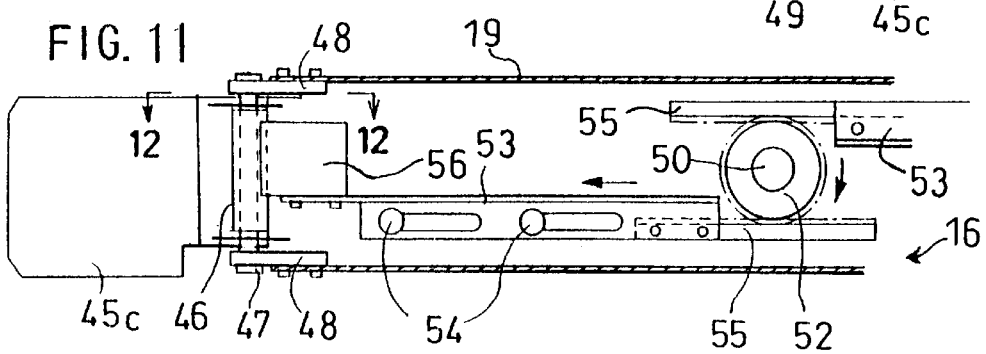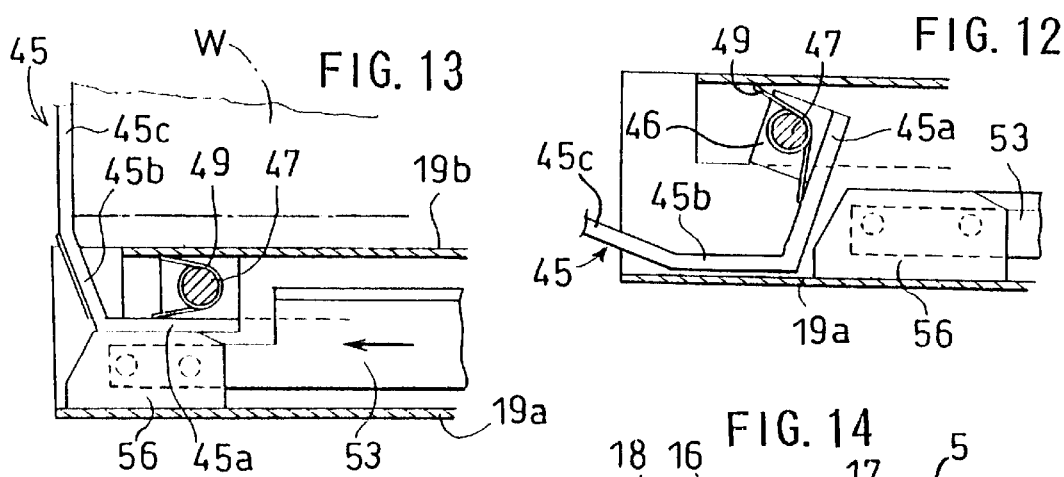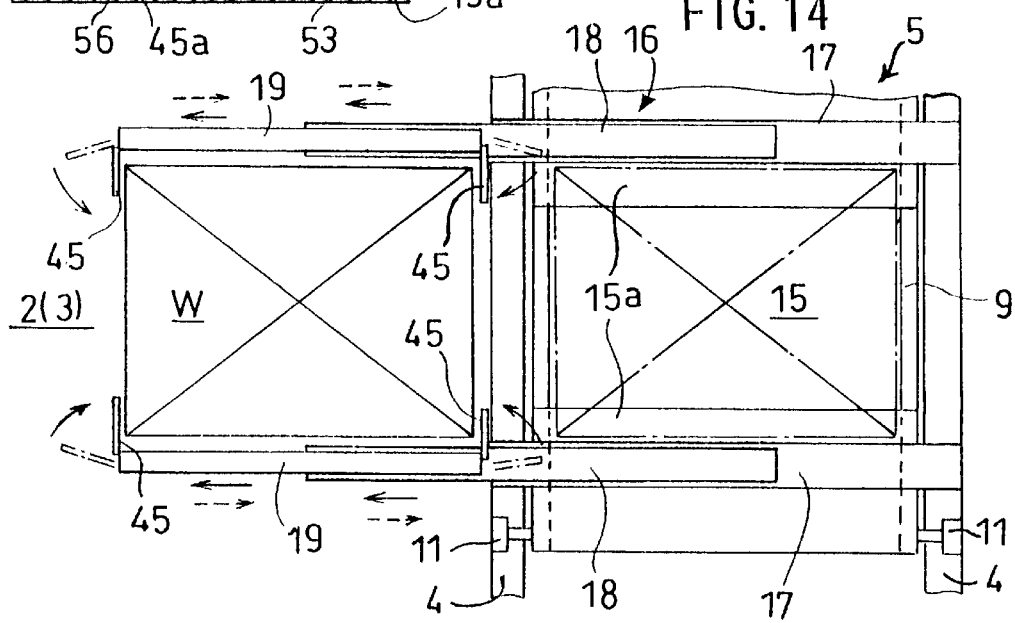

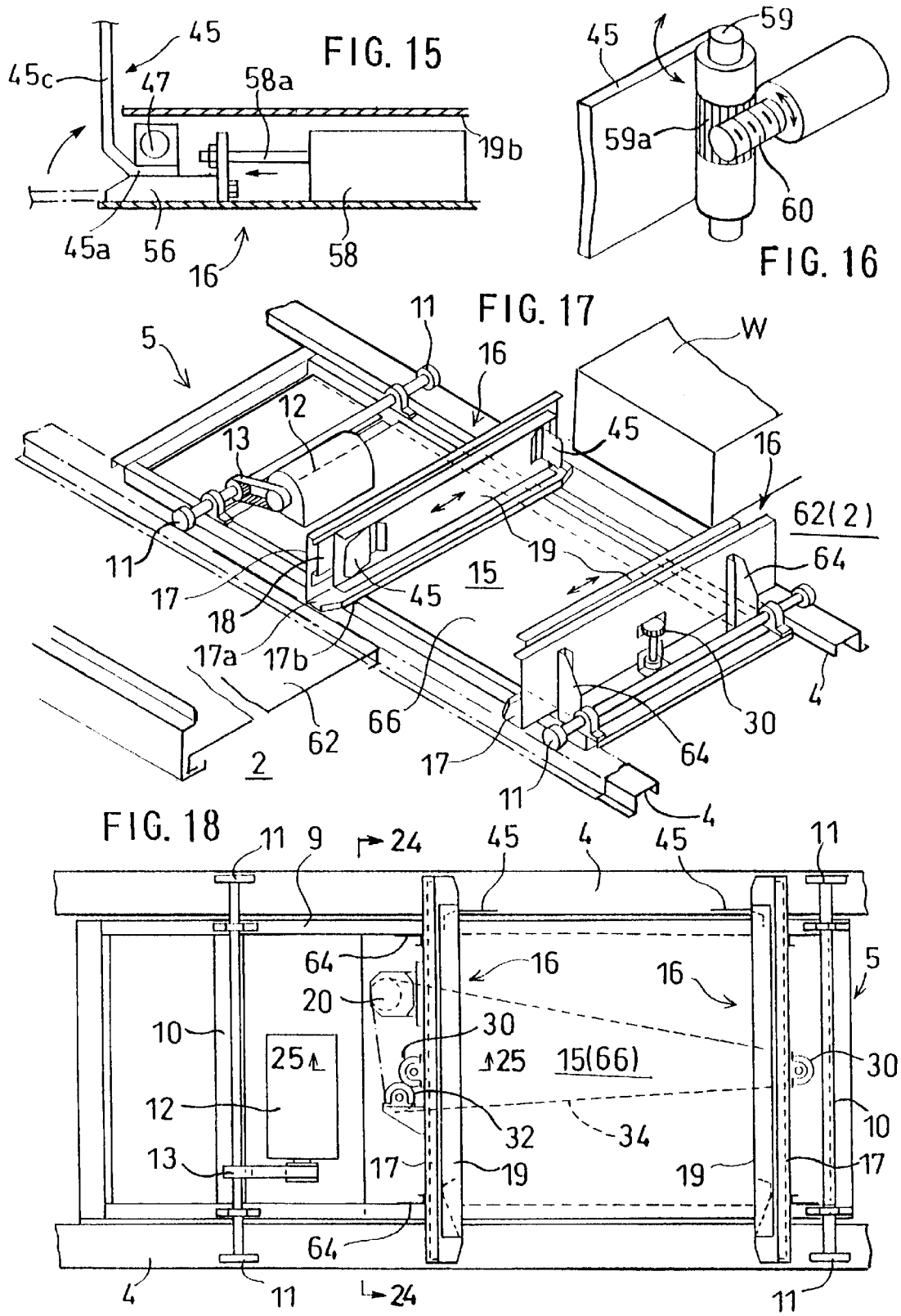

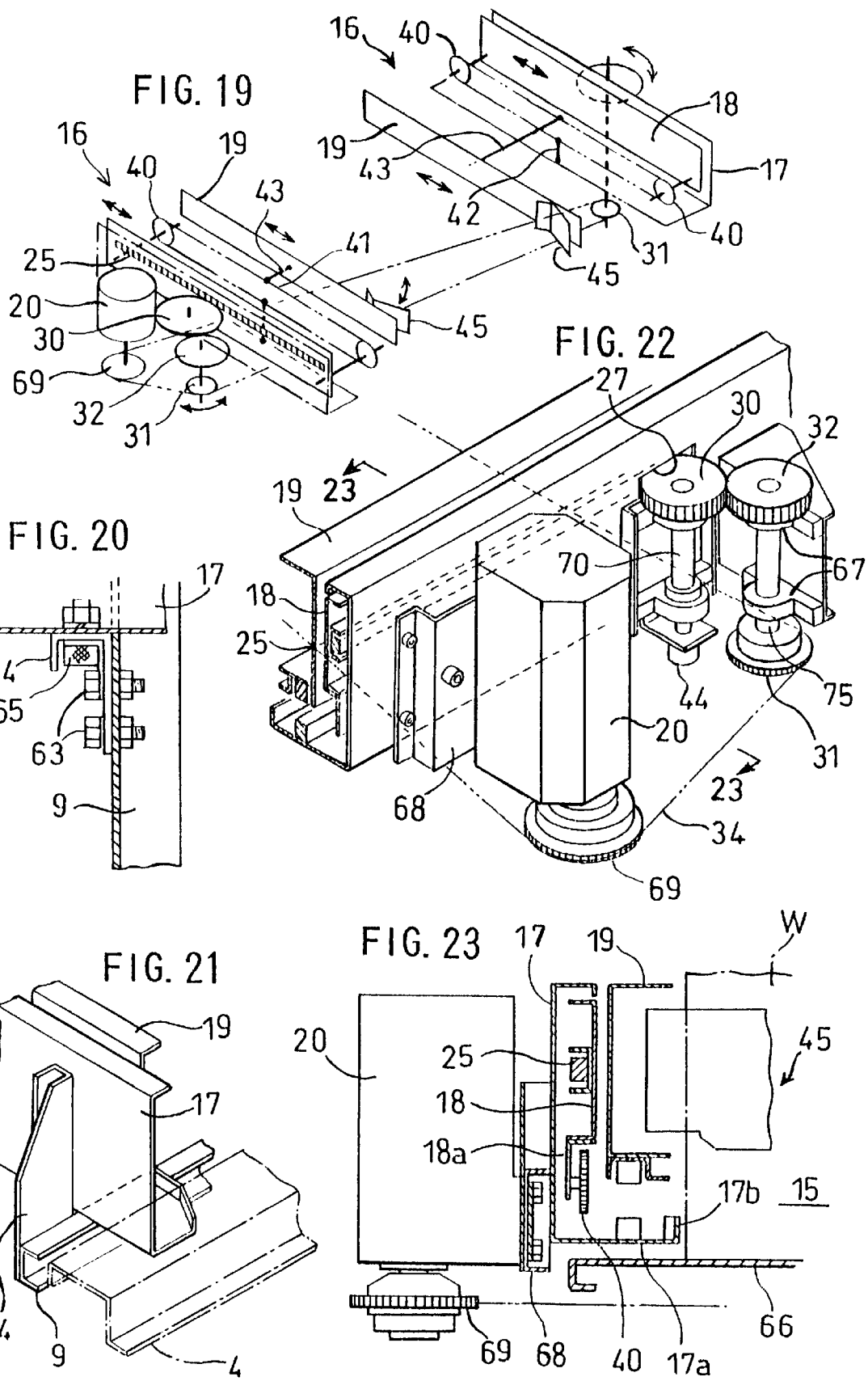

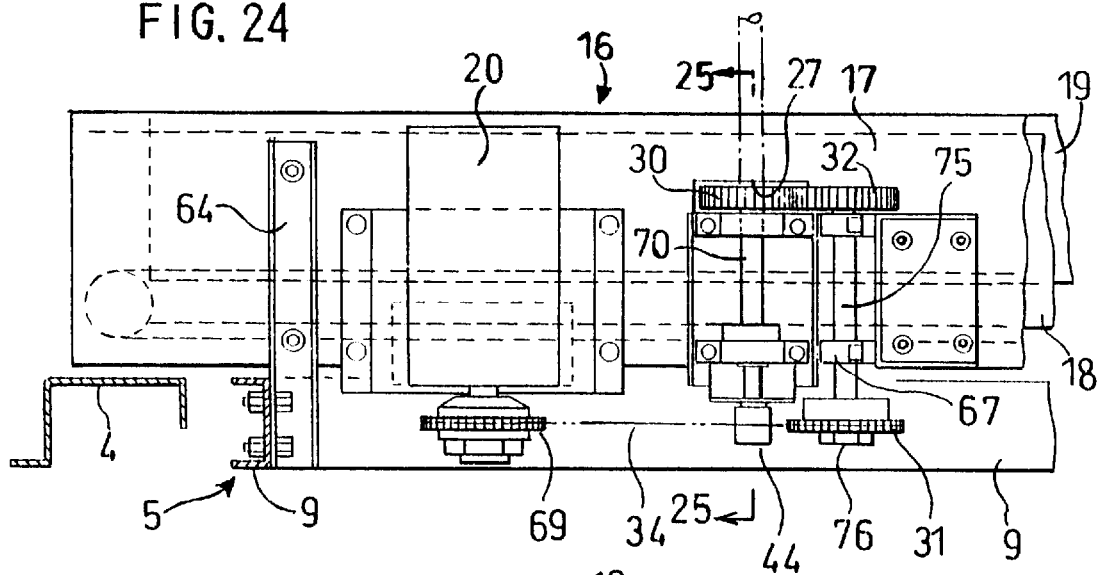
FIG. 24
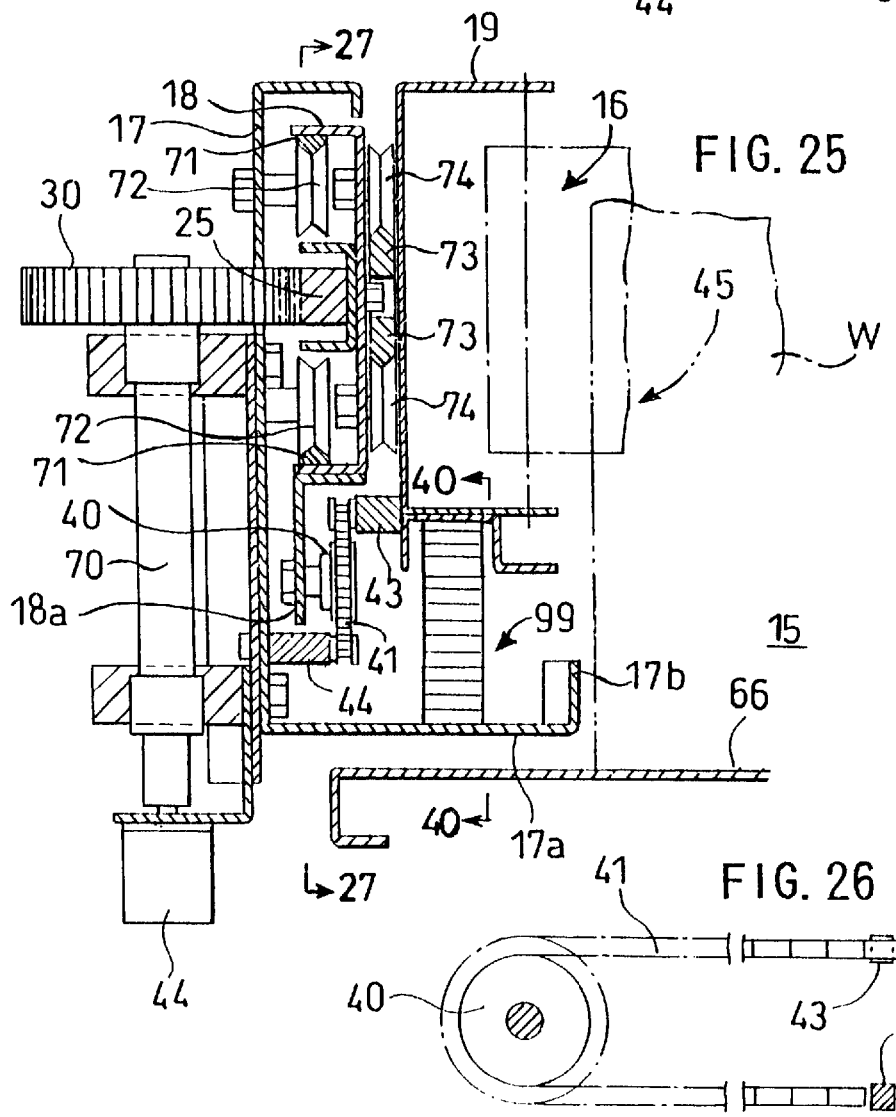
FIG. 25
FIG. 26

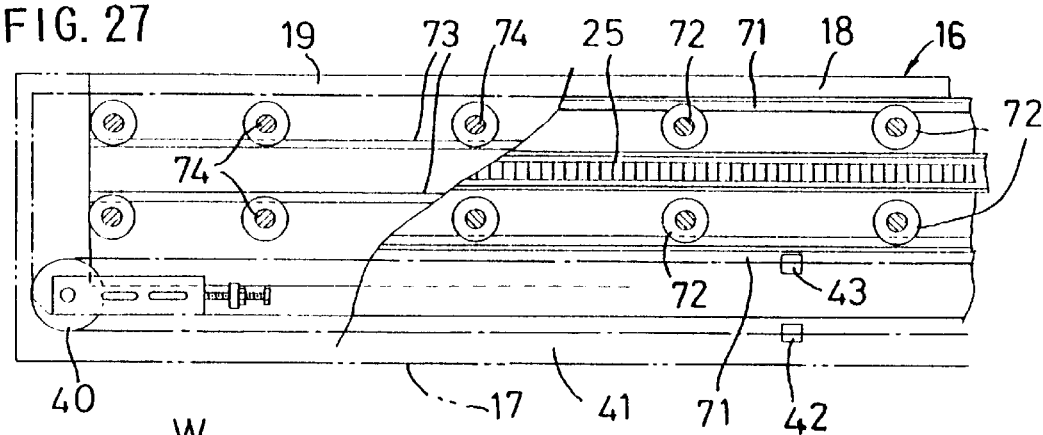
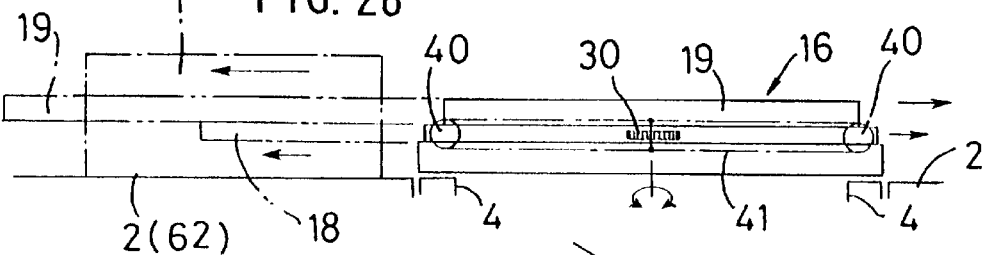
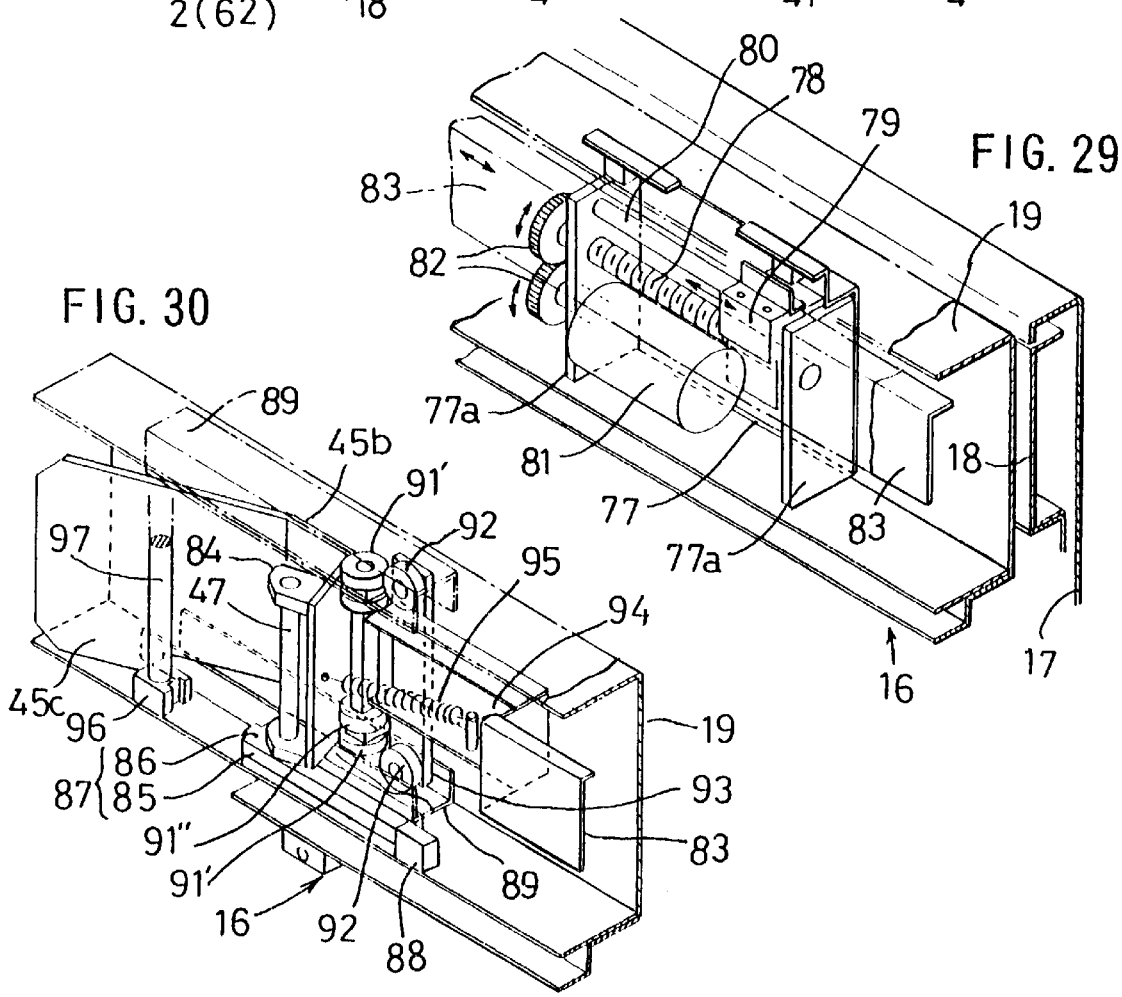

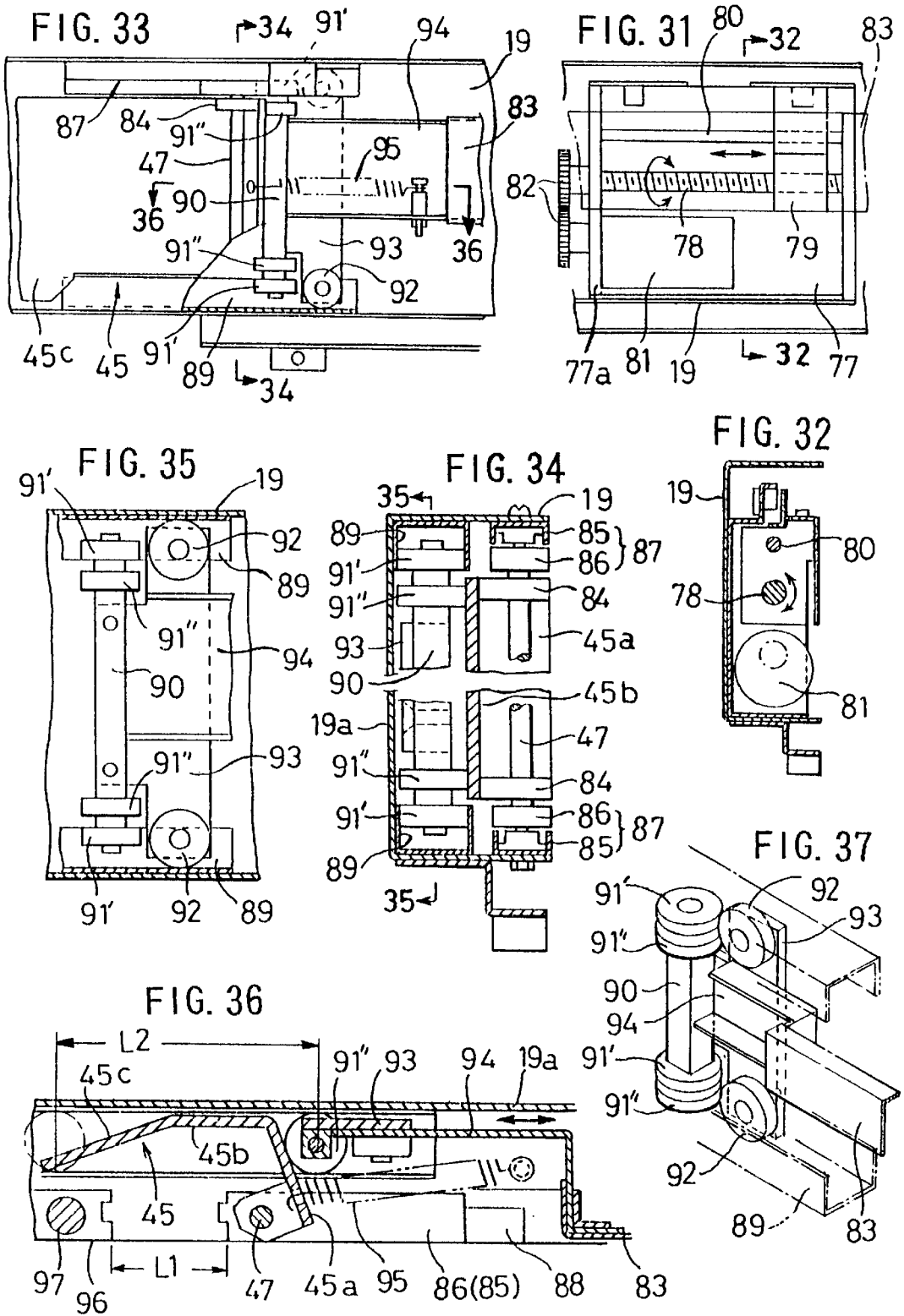

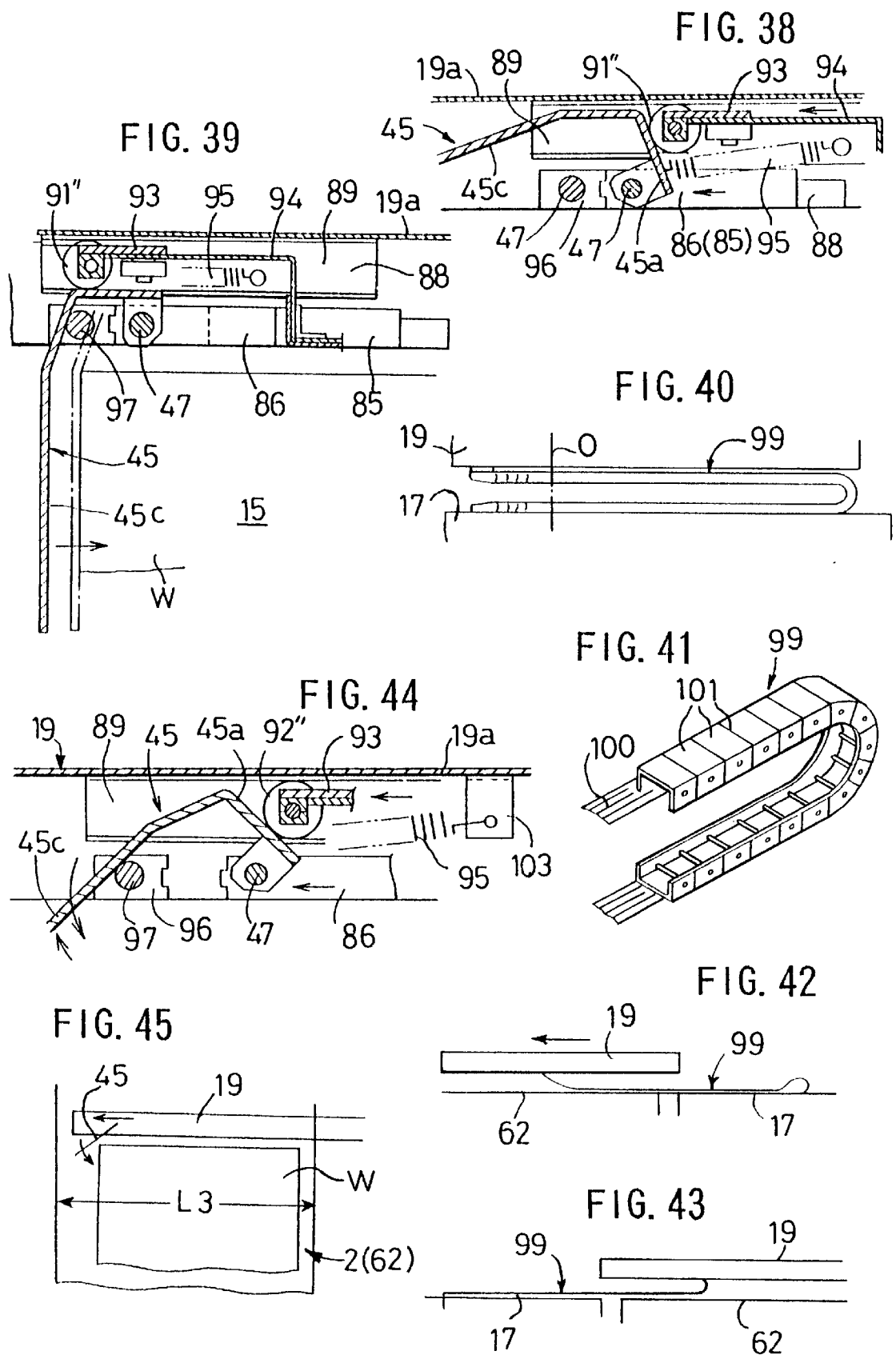

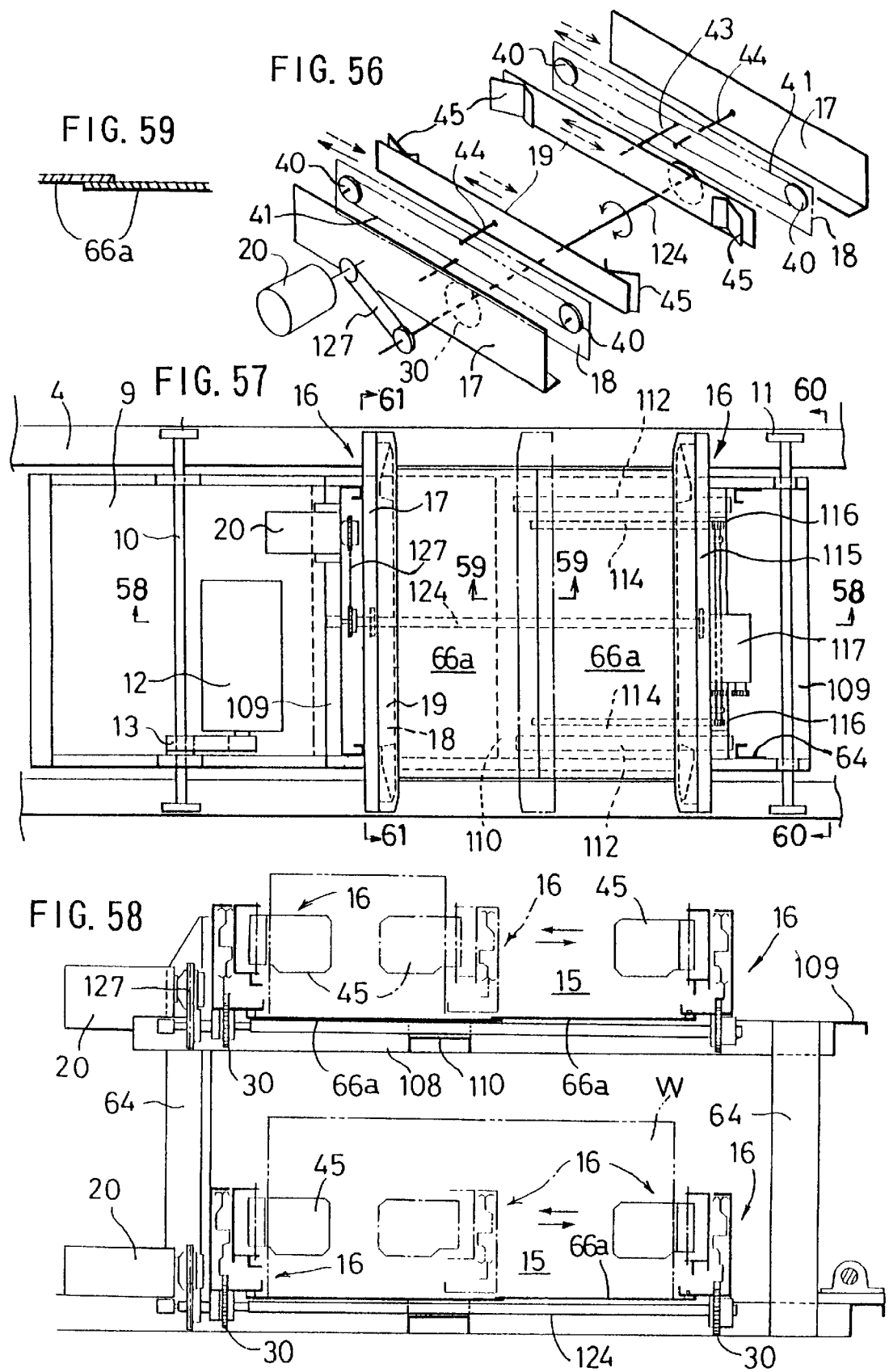

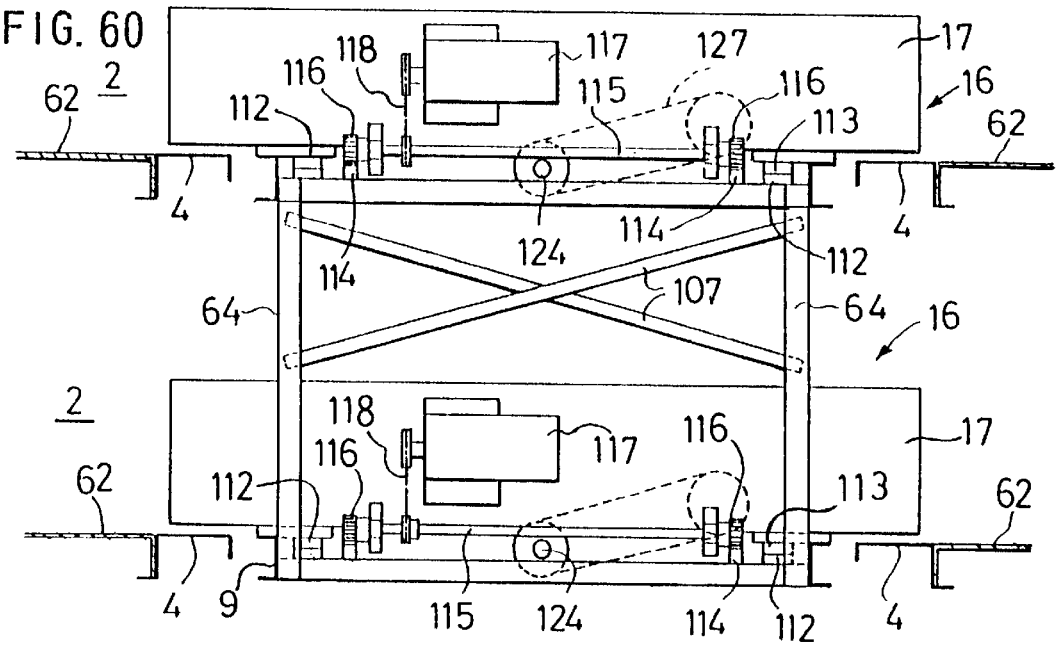
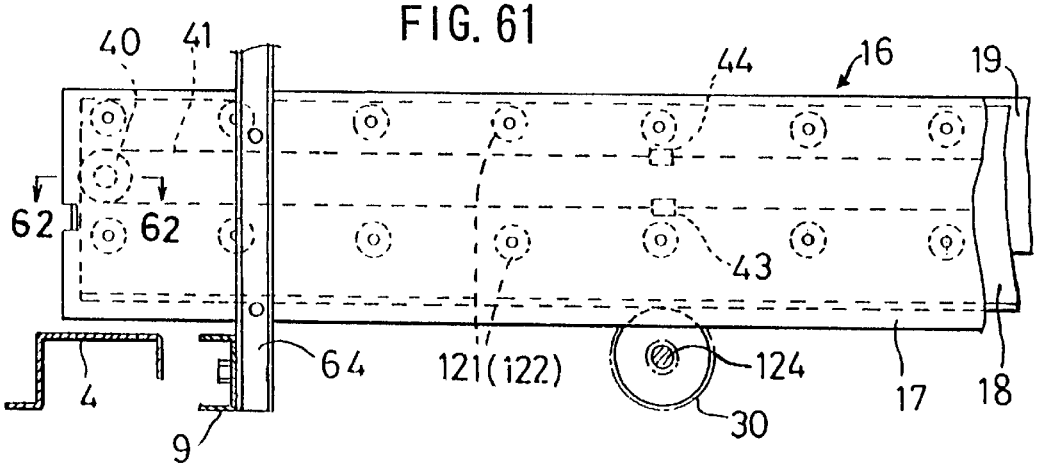
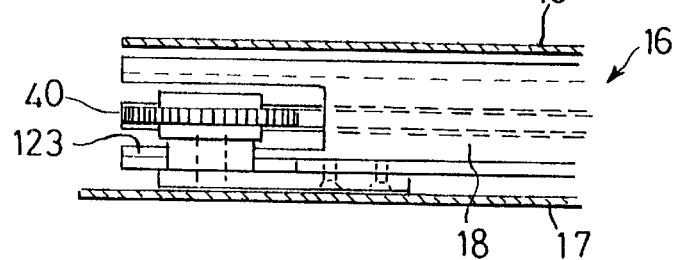

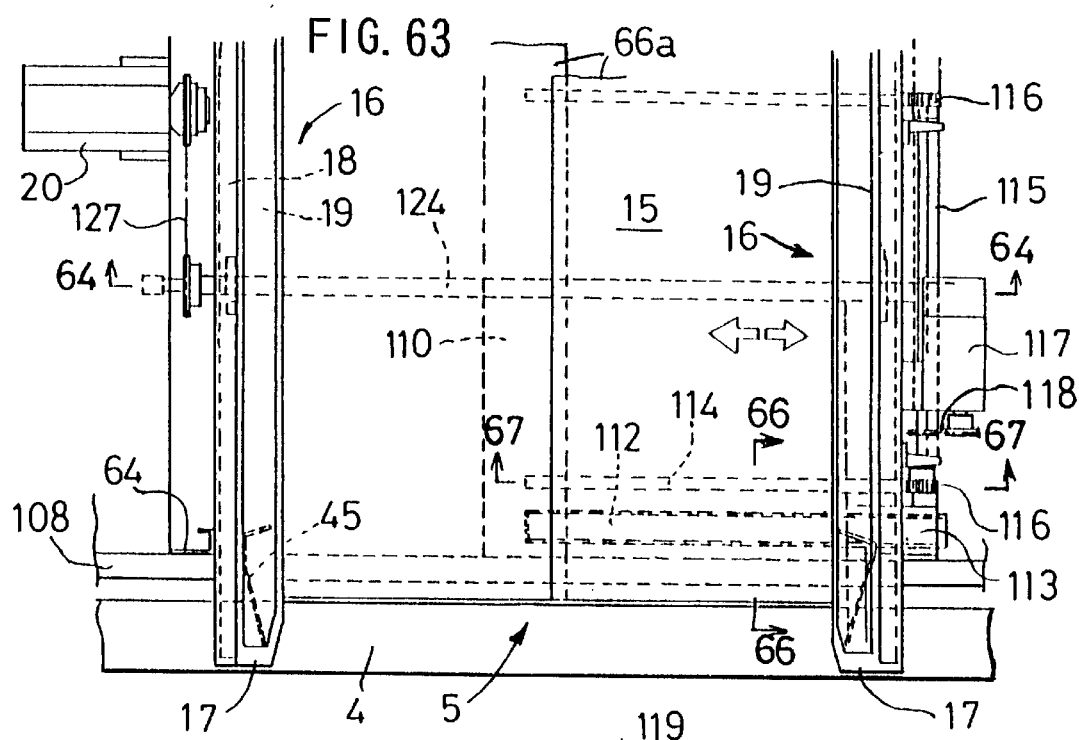
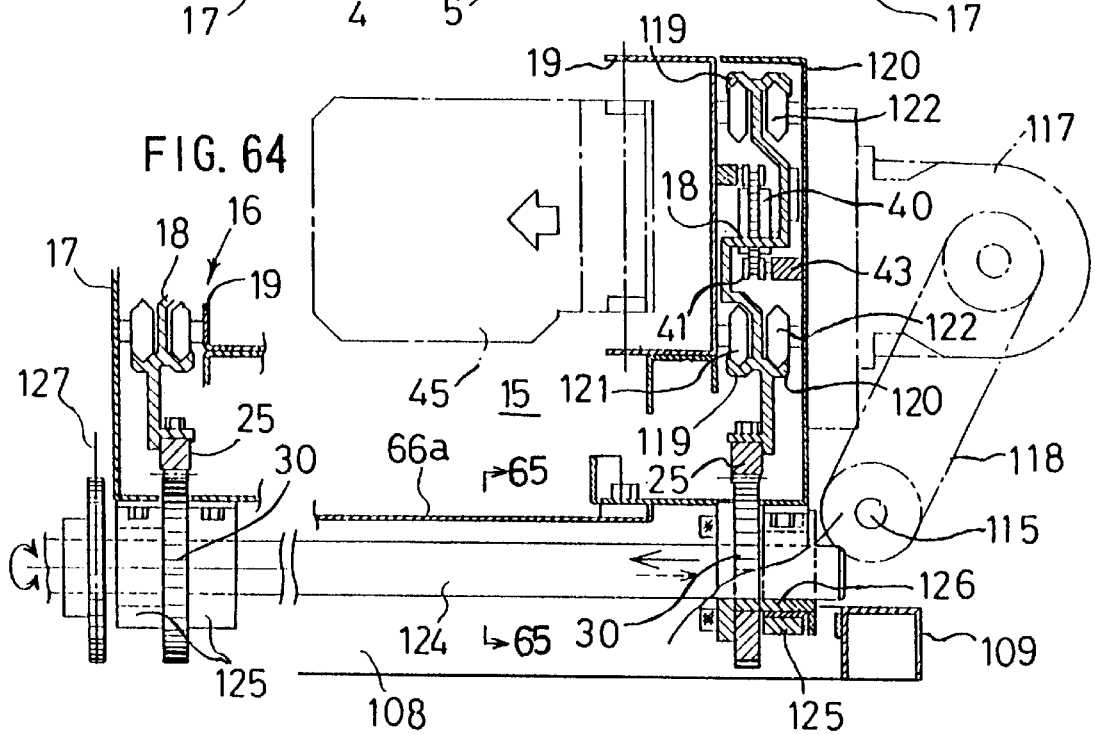
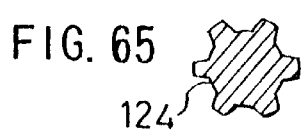
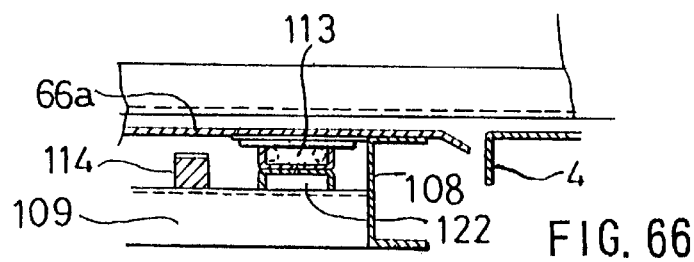

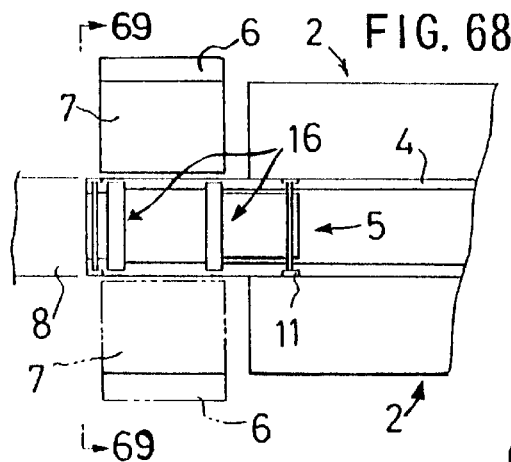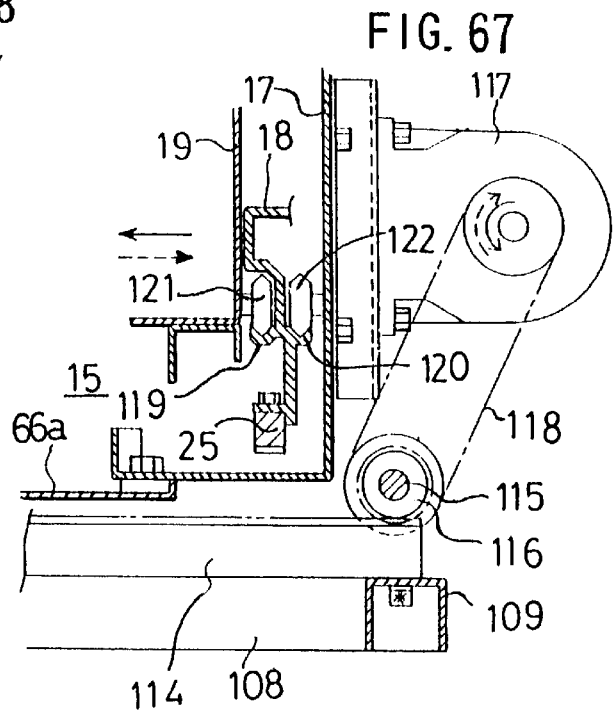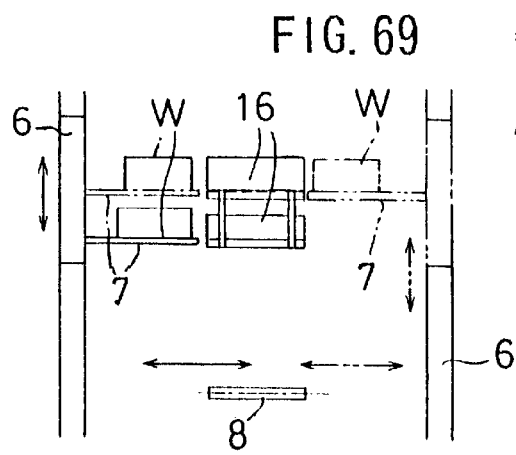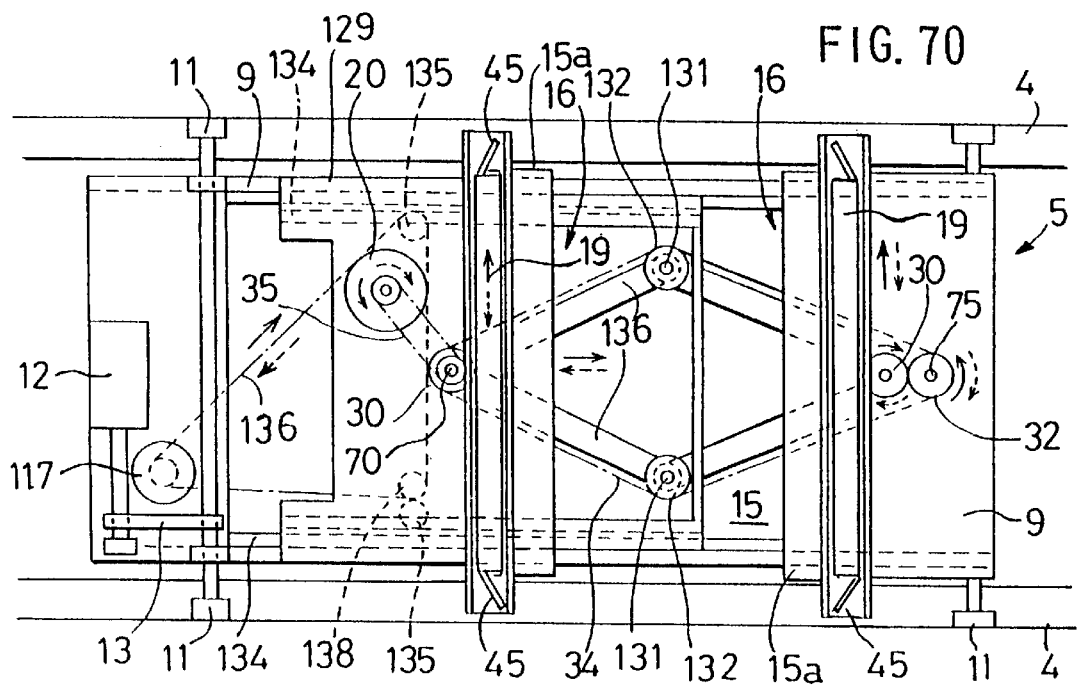

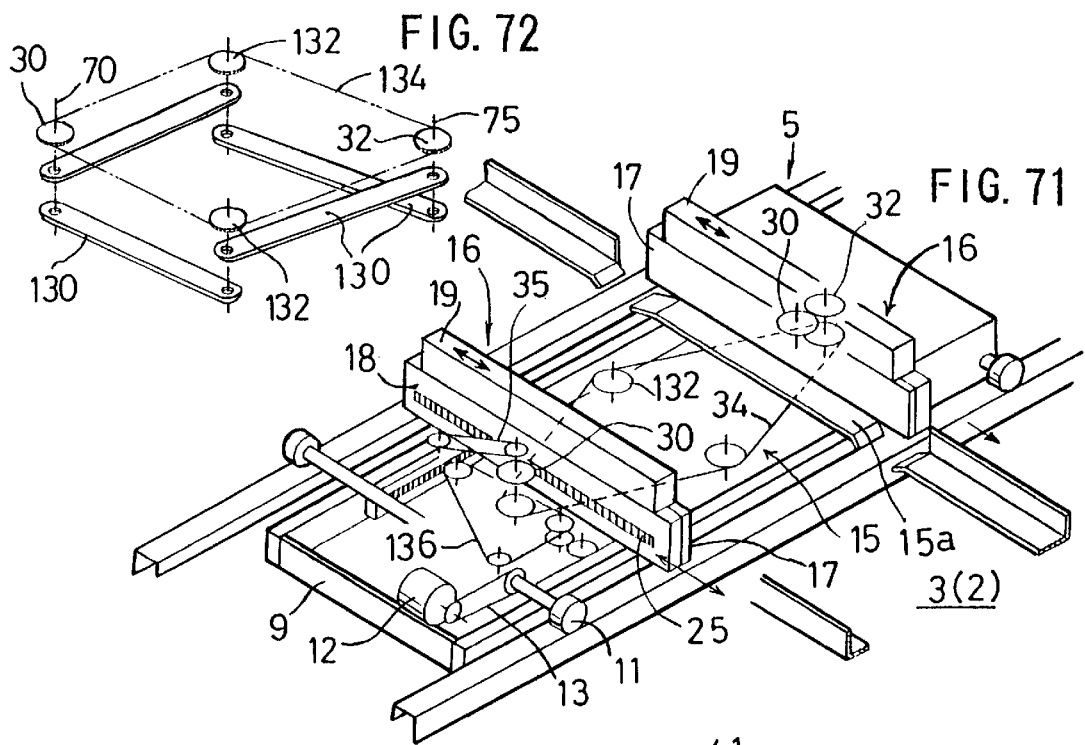
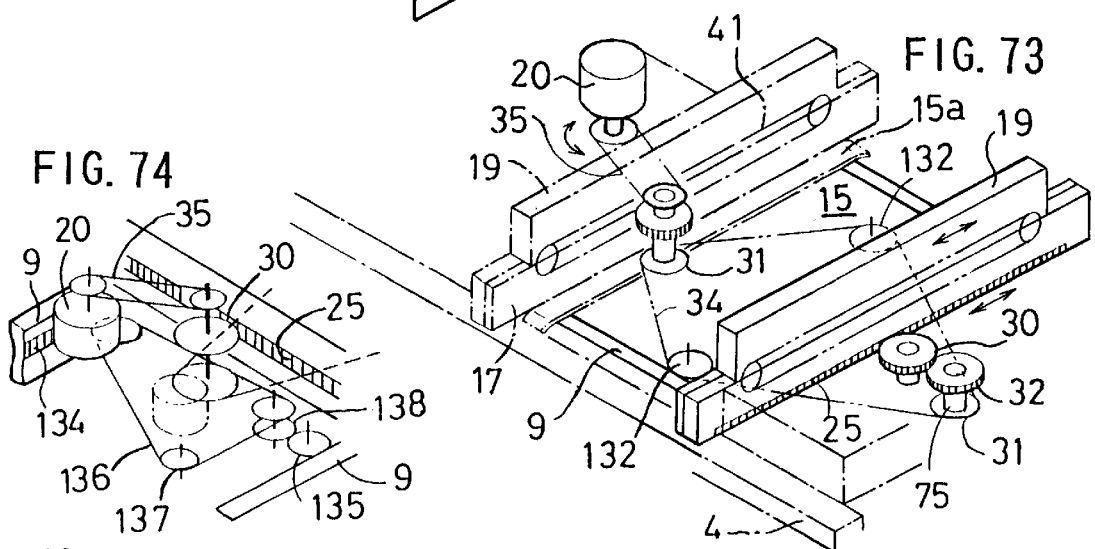
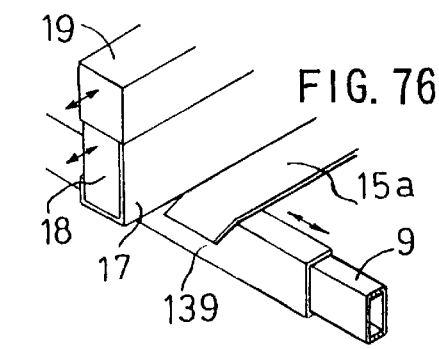
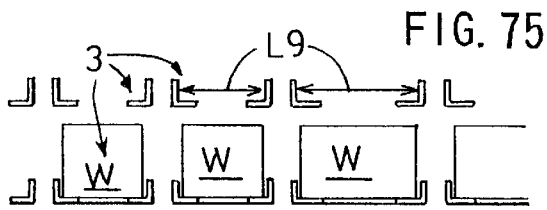

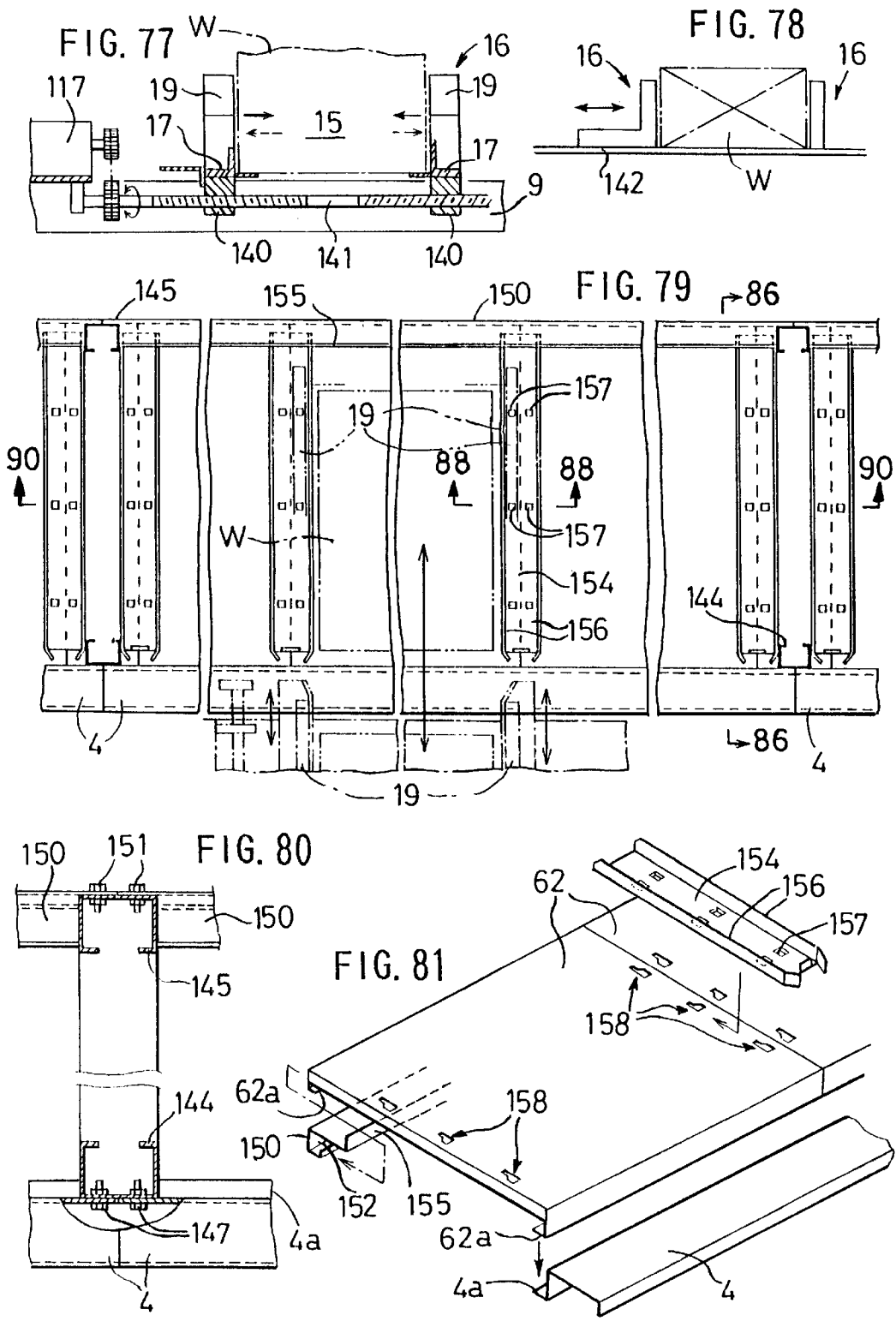

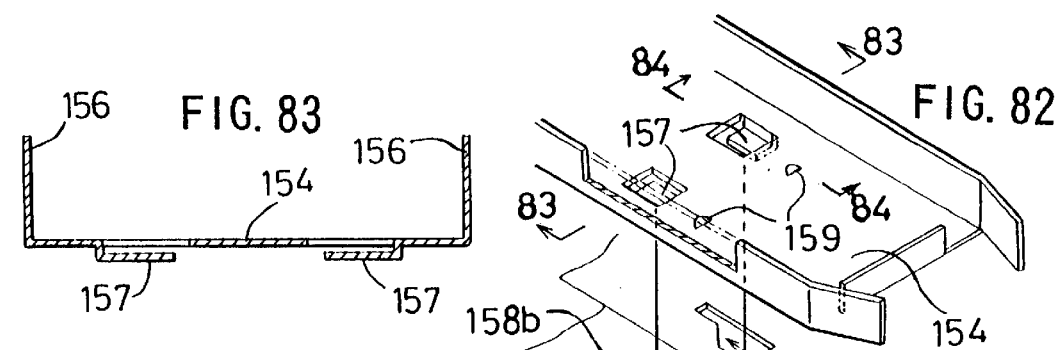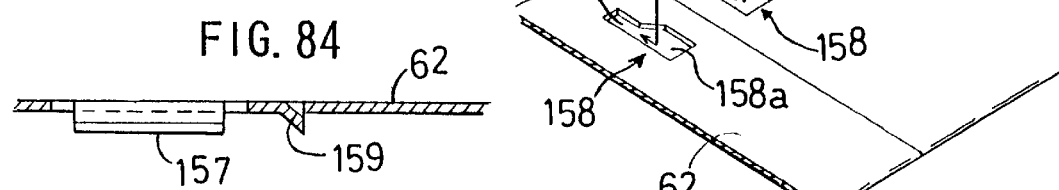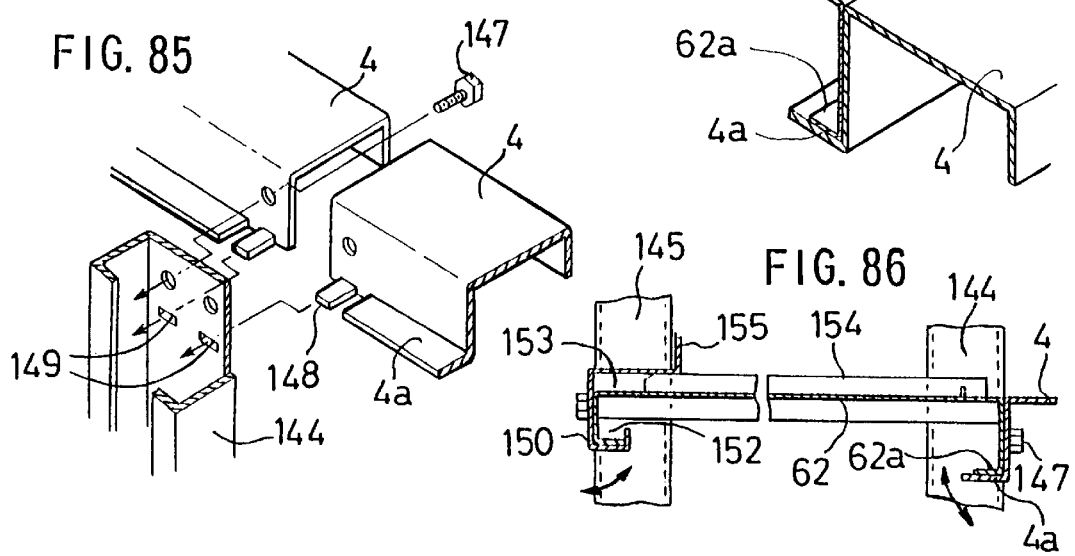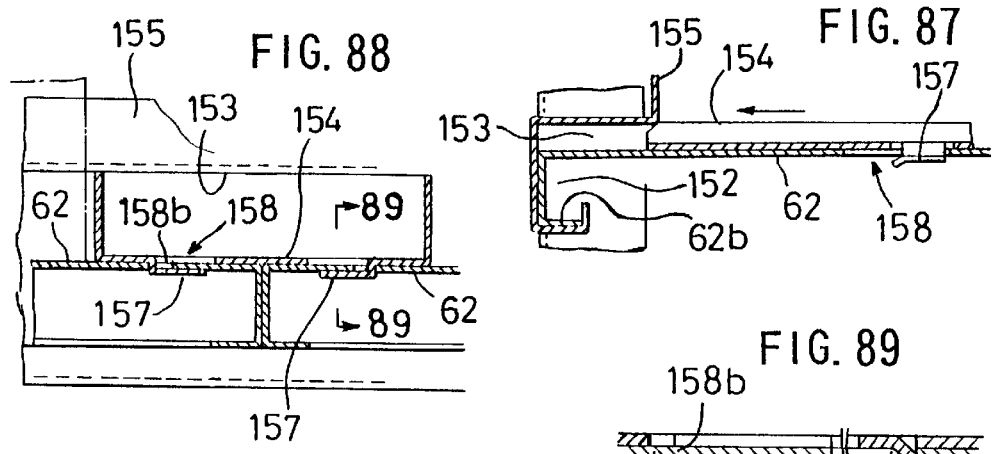

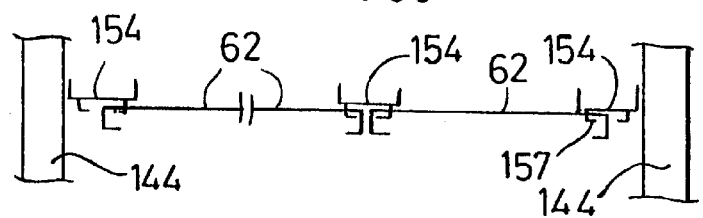
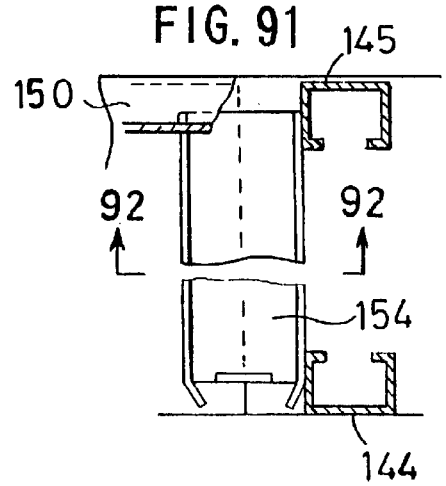
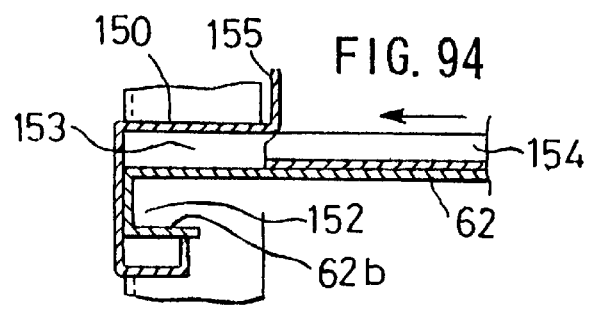
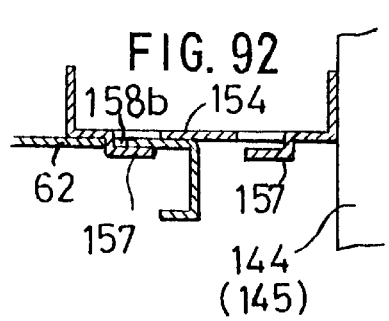
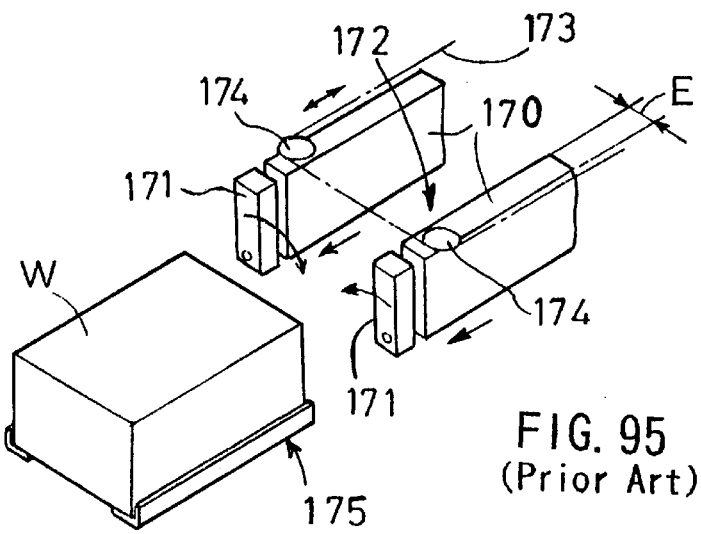
FIG. 95 (Prior Art)

CARRIAGE FOR STORAGE-RETRIEVAL SYSTEM WITH LOCKING-ENGAGING MEMBERS

BACKGROUND OF THE INVENTION

1. Field of the Invention

The present invention relates to a carriage used for a storage-retrieval system.

2. Description of the Related Art

A typical storage-retrieval system includes a shelf assembly having a plurality of shelves disposed at various heights, and a carriage movable along the front surface of the shelf assembly. In such a storage-retrieval system, the carriage is automatically lead to a desired storage portion of the shelf assembly. Then, the shifting operation of an object such as a cargo for example is performed from the shelf assembly onto the carriage or vice versa.

The above carriage includes a pair of movable devices arranged to reciprocate toward and away from the shelf assembly. Each movable device is provided with engaging members arranged to selectively assume a closed position and an open position. In closed position the engaging members are brought into contact with the object to be shifted, while in the open position the engaging members are brought out of contact with the object. During the shifting operation, the movable devices are actuated, with the engaging members held in the closed position. As a result, the object is shifted between the carriage and the storage portion of the shelf assembly.

There are various kinds of movable devices having the above arrangement. One example is disclosed in Japanese Patent Application Laid-open No. 7-101508. The carriage disclosed in this document is schematically shown in FIG. 95 of the accompanying drawings. Specifically, the carriage includes an illustrated base member which supports a pair of shifting members 170 capable of moving toward and away from a shelf assembly (not shown). Both ends of each shifting member 170 are provided with engaging members 171. The illustrated engaging member is arranged to pivot around a horizontal shaft between an upright position and an inwardly horizontal position. The pivotal movement of the engaging member 171 is driven by an unillustrated motor via a chain 173. The chain 173 engages two sprockets 174.

The above prior art carriage has the following problems. Specifically, when an object to be shifted is not placed at a proper position in a storage region 175 or on the carriage, the object may obstruct the pivotal movement of the engaging member 171. In such a case, the engaging member 171 is unable to assume the closed position (the horizontal position), resulting in failure to perform the intended shifting of the object W. Further, with the prior art arrangement, the moment acting on engaging members 171 during the shifting operation of the object W will be concentrated at a fixing portion of the engaging member 171 to the shifting member 170. Thus, the engaging member 171 and the shifting member 170 will be damaged at a relatively earlier stage.

Further, the width E of the shifting member 170 needs to be as small as possible so that the carriage handles a larger object W. However, when the width E of the shifting member is reduced, the width of the engaging member 171 should be reduced accordingly. In this case, the area of the engaging member 171 to contact the object W is so small that unfavorable damage or deformation will be caused on the object W. This problem will become more serious when the object W is a cardboard box for example.

Still further, it is difficult or even impossible for the prior art carriage to handle a rather tall object W due to the chain 173 provided between the upper surfaces of the respective shifting members 170.

SUMMARY OF THE INVENTION

It is, therefore, an object of the present invention to provide a carriage for a storage-retrieval system that overcomes the above problems.

According to one aspect of the present invention, there is provided a carriage for a storage-retrieval system including a shelf assembly. The carriage includes: a base member; at least one carrier region provided above the base member for supporting an object to be transferred; at least one pair of shifting units flanking the carrier region, the shifting units being reciprocally movable into and away from the shelf assembly; and engaging members mounted on the shifting units. Each of the engaging members is arranged to pivot about a vertical axis and movable between a closed position for contacting the object and an open position for avoiding the contacting with the object.

With such an arrangement, it is possible to use an engaging member having a large surface area since the engaging member is arranged to pivot about a vertical shaft.

The carriage according to the present invention may include driving means for moving the engaging members. The driving means is preferably mounted on the shifting unit. With such an arrangement, it is possible for the carriage to handle a rather tall object.

The carriage of the present invention may include locking means for holding the engaging members in the closed position. The locking means may be made in a wedge-like form.

Further, each shifting unit may include a first shifting member movable relative to the base member and a second shifting member movable relative to the first shifting member.

Each engaging member may be reciprocally movable relative to a corresponding shifting unit by a predetermined distance in a longitudinal direction of the corresponding shifting unit.

Each engaging member may assume the closed position when each engaging member comes to an extremity of the reciprocal movement relative to the corresponding shifting unit. Each engaging member may gradually approach the closed position as it is being moved toward the shelf assembly.

The carriage may include more than one carrier region for carrying objects and more than one pair of shifting units opposite to each other across the respective carrier portions.

According to the present invention, the distance between the shifting units may be variable. A spline shaft may be rotatably mounted below the carrier portion. The spline shaft is connected to the shifting units to transmit driving force so that the shifting units are synchronously reciprocated.

Further, the shifting units may be provided with a sensor for detecting an object present at the carrier region or the shelf assembly during the reciprocating movement.

It should be noted that the carriage according to the present invention is described as an apparatus which is movable along the front surface of the shelf assembly and performs the shifting of an object. Therefore, a stacker crane for example is also included within the scope of the present invention.

Other objects, features and advantages of the present invention will be clearer from the detailed explanation of the preferred embodiments described below with reference to the accompanying drawings.

BRIEF DESCRIPTION OF THE DRAWINGS

In the accompanying drawings:

FIG. 2 is a perspective sectional view schematically showing the carriage and a shelf;

FIG. 3 is a perspective view schematically showing the driving mechanism for a shifting member;

FIG. 4 is a schematic view showing the driving mechanism for a shifting member;

FIG. 5 is a sectional view taken along lines 5—5 in FIG. 3;

FIG. 6 is a sectional view taken along lines 6—6 in FIG. 5;

FIG. 7 is a sectional view taken along lines 7—7 in FIG. 6;

FIG. 8 is a sectional view taken along lines 8—8 in FIG. 6;

FIG. 9 is a perspective view showing the engaging member;

FIG. 10 is a sectional view showing a right-hand half of the shifting unit taken along lines 10—10 in FIG. 6;

FIG. 11 is a sectional view showing a left-hand half of the shifting unit taken along lines 10—10 in FIG. 6;

FIG. 12 is a sectional view taken along lines 12—12 in FIG. 11;

FIG. 13 is a plan view showing the engaging member in a closed position;

FIG. 14 is a plan view showing the shifting operation of the object;

FIG. 15 is a plan view showing the second embodiment;

FIG. 16 is a perspective view showing the third embodiment;

FIG. 17 is a perspective view schematically showing a carriage according to the fourth embodiment;

FIG. 18 is a plan view swing the carriage;

FIG. 19 is a perspective view schematically showing the driving system for the shifting unit;

FIG. 20 is a plan view showing the arrangement of a fixing member;

FIG. 21 is a perspective view showing the arrangement of a fixing member;

FIG. 22 is a perspective view showing the driving mechanism for the shifting member;

FIG. 23 is a sectional view taken along lines 23—23 in FIG. 22;

FIG. 24 is a sectional view taken along lines 24—24 in FIG. 18;

FIG. 25 is a sectional view taken along lines 25—25 in FIG. 18;

FIG. 26 showss a chain for driving the shifting member;

FIG. 27 is a sectional view taken along lines 27—27 in FIG. 25;

FIG. 28 schematically shows the shifting member in motion;

FIG. 29 is a perspective view showing a central portion of the shifting member;

FIG. 30 is a perspective view showing the end of a second shifting member;

FIG. 31 is a plan view showing the central portion of the second shifting member;

FIG. 32 is a sectional view taken along lines 32—32 in FIG. 31;

FIG. 33 is a front view showing an end of the second shifting member;

FIG. 34 is a sectional view taken along lines 34—34 in FIG. 33;

FIG. 35 is a sectional view taken along lines 35—35 in FIG. 34;

FIG. 36 is a sectional plan view taken along lines 36—36 in FIG. 33;

FIG. 37 is a perspective view partially showing the fixing portion of the engaging member;

FIG. 38 is a sectional plan view of the engaging member in motion;

FIG. 39 is a sectional plan view of the engaging member coming to an end of movement;

FIG. 40 is a sectional view taken along lines 40—40 in FIG. 25;

FIG. 41 is a perspective view showing a flexible cover;

FIG. 42 illustrates a relation between the shifting unit and the flexible cover;

FIG. 43 illustrates a relation between the shifting unit and the flexible cover;

FIG. 44 is a sectional view showing the fifth embodiment;

FIG. 45 illustrates the action of the fifth embodiment;

FIGS. 46–52 show the sixth embodiment, of which FIG. 46 is a plan view showing the carriage, whereas FIGS. 47–52 illustrate the action of a controlling manner;

FIG. 52 illustrates the action of a controlling manner;

FIG. 56 schematically illustrates the driving system for the shifting member;

FIG. 57 is a plan view showing the carriage;

FIG. 58 is a sectional view taken along lines 58—58 in FIG. 57;

FIG. 59 is a sectional view taken along lines 59—59 in FIG. 57;

FIG. 60 is a view taken along lines 60—60 in FIG. 57;

FIG. 61 is a sectional view taken along lines 61—61 in FIG. 57;

FIG. 62 is a sectional view taken along lines 62—62 in FIG. 61;

FIG. 63 is a plan view showing principal parts of the carriage;

FIG. 64 is a sectional view taken along lines 64—64 in FIG. 63;

FIG. 65 is a sectional view taken along lines 65—65 in FIG. 64;

FIG. 66 is a sectional view taken along lines 66—66 in FIG. 63;

FIG. 67 is a sectional view taken along lines 67—67 in FIG. 63;

FIG. 68 is a plan view showing the lift;

FIG. 69 is a view taken along lines 69—69 in FIG. 68;

FIG. 70 is a plan view showing a carriage according to the ninth embodiment;

FIG. 71 is a perspective view schematically showing the driving system for the shifting member;

FIG. 72 is a perspective view schematically showing the arrangement of a width-adjusting chain;

FIG. 73 is a perspective view schematically showing the driving system for the shifting member;

FIG. 74 is a perspective view schematically showing driving system for width adjustment;

FIG. 75 is a front view showing the tenth embodiment;

FIG. 76 is a perspective view illustrating the eleventh embodiment;

FIG. 77 is a sectional view showing the twelfth embodiment;

FIG. 78 illustrates the thirteenth embodiment;

FIG. 79 is a plan view showing a self assembly;

FIG. 80 is a sectional plan view showing the arrangement of the shelf;

FIG. 81 is an exploded perspective view showing the shelf assembly;

FIG. 82 is an exploded perspective view showing principal parts;

FIG. 83 is a sectional view taken along lines 83—83 in FIG. 82;

FIG. 84 is a sectional view taken along lines 84—84 in FIG. 82;

FIG. 85 is an exploded perspective view showing the fixing arrangement of the rail;

FIG. 86 is a schematically sectional view taken along lines 86—86 in FIG. 79;

FIG. 87 is a sectional view showing the fixing arrangement of the shelf;

FIG. 88 is a sectional view taken along lines 88—88 in FIG. 79;

FIG. 89 is a sectional view taken along lines 89—89 in FIG. 88;

FIG. 90 is a sectional view taken along lines 90—90 in FIG. 79;

FIG. 91 is a plan view showing the arrangement near a supporting post;

FIG. 92 is a sectional view taken along lines 92—92 in FIG. 91;

FIG. 93 is a sectional view showing an example of modified shelf;

FIG. 94 is a sectional view showing another example of modified shelf; and

FIG. 95 is a perspective view schematically showing the prior art.

DETAILED DESCRIPTION OF THE PREFERRED EMBODIMENTS

Preferred embodiments of the present invention will be described below.

(1) First Embodiment (FIGS. 1–14)

Figure 1:
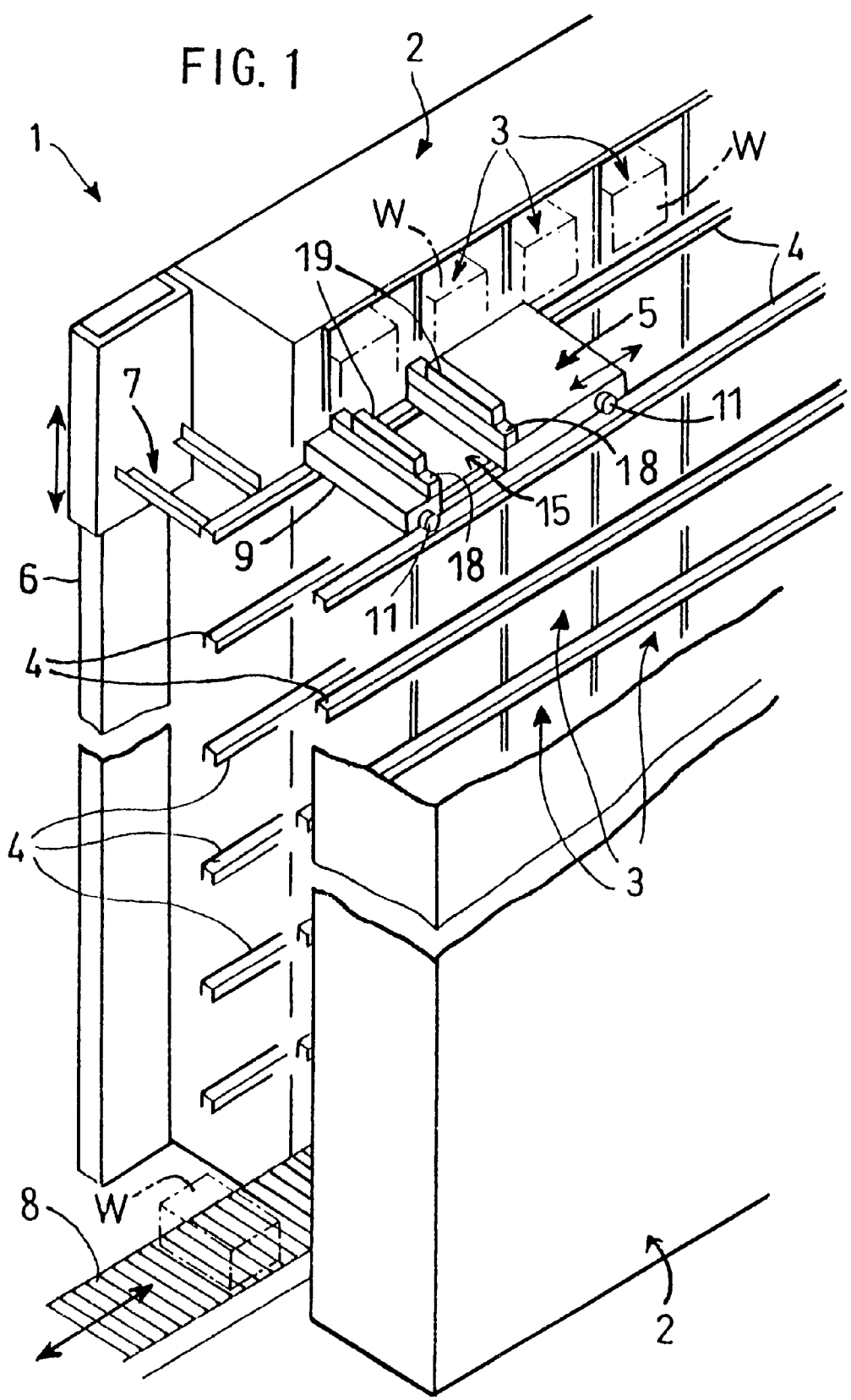
FIG. 1 is a perspective view schematically showing a carriage according to the first embodiment and a storage-retrieval system for which the carriage is advantageously used.

FIGS. 1–14 illustrate a carriage according to a first embodiment of the present invention. In FIG. 1, reference numeral 1 generally indicates a storage-retrieval system for which the above-mentioned carriage is advantageously used. The illustrated storage-retrieval system 1 includes two shelf assemblies 2. Each of the shelf assemblies has a plurality of storage compartments 3 disposed adjacently in the vertical and horizontal directions. The shelf assembly has a front side on which the storage compartments are open to the exterior. Thus, it is possible to put objects W into the storage compartments and take them out therefrom. As seen from FIG. 1, the two shelf assemblies 2 are arranged in a parallel relation with their front sides facing each other with a predetermined spacing therebetween. The objects W to be stored may be a cardboard box, a wooden box, a plastic container and the like. The illustrated shelf assembly is vertically and horizontally partitioned into the storage compartments 3. However, the shelf assembly 2 may be more simply constructed, so that it only has a plurality of horizontal plates disposed at different heights but no vertical partitions.

As shown in FIG. 1, a plurality of pairs of horizontal rails 4 are provided at different heights between the two shelf assemblies 2. Each pair of the rails 4 extends in parallel to the front side of the shelf assemblies and corresponds to one of the horizontal rows of the storage compartments 3. The carriage 5 is suitably designed to move on these rails. With such an arrangement, as will be described in detail hereinafter, it is possible to lead the carriage 5 to a desired storage compartment 3 for shifting the object W into or out from the desired storage compartment.

A vertically extending column 6 is provided adjacent to one of the two shelf assemblies 2. The column 6 guides a lift 7 for vertical movement. The lift 7 is designed to be held at desired heights on the column. On the other hand, each pair of rails 4 extends along the front side of the shelf assemblies and up to a suitable point close to the column 6. Thus, it is possible to conveniently shift the object W from the carriage 7 to the lift 7 and vice versa by adjusting the height of the lift 7 to the pair of rails 4 on which the carriage 5 is mounted.

The illustrated storage-retrieval system 1 is also provided with a conveyor 8 extending below and in parallel relation to the rails 4. The conveyor 8 is used to carry the object W into and out of the storage-retrieval system 1. With such an arrangement, when the object W is intended to be brought into the system to be stored in a selected compartment 3, first the object W is carried by the conveyor 8 to the location of the lift 7 to be shifted onto the lift. Then, the lift 7 is raised up to the height corresponding to the selected compartment. Then, the object W is shifted from the lift 7 onto the carriage 5. Finally, the carriage is moved to the front of the selected storage compartment 3 and the object is shifted into the storage compartment. In taking the stored object W is taken out of the system, the above steps are performed in the reversed order.

Referring to FIGS. 2–4, the rails 4, the storage compartment 3 and the carriage 5 will be described. FIG. 2 is a perspective view showing the basic structures of the carriage 5 and the shelf assembly 2. FIG. 3 is a perspective view illustrating a driving system of the carriage 5. FIG. 4 is an illustration of the carriage as viewed in the direction indicated by arrow A in FIG. 3.

As shown in FIG. 2, the storage compartment 3 includes a pair of elongated supporting pieces 3a. These supporting pieces are disposed in parallel relation and spaced from each other. The supporting pieces 3a are designed to support the edges of the object W alone. However, it is also possible to provide a shelf plate wide enough to support the entirety of the base surface of the object W.

As shown in FIG. 2 for example, each of the rails 4 is cross-sectionally formed into a rectangle with the bottom side missing. Thus, the rail is open to below. It is obvious that the cross-sectional figure of the rail is not limited to this embodiment. The longitudinal ends of each rail 4 are supported by suitable supporting frames (not shown), respectively. The upper surface of the rail 4 and the upper surface of the supporting piece 3a are equal in height. Thus, the object W is conveniently slid between the storage compartment 3 and the carriage 5 via the rail 4.

Referring to FIG. 2 again, the carriage 5 includes a rectangular base member 9. The base member is elongated in the moving direction of the carriage. Two shafts 10 are carried by the base member 9 for rotation relative to the base member. The two shafts are disposed perpendicularly to the moving direction of the carriage and spaced from each other in this direction. Each shaft 10 is provided at its both ends with wheels 11, respectively. A driving motor 12 is attached to the base member 9 for moving the carriage 5 relative to the rails 4. The motor 12 is located close to one of the two shafts 10. The rotation shaft of the motor 12 and the shaft 10 closer to the motor are coupled via a timing belt 13. Thus, it is possible to cause the carriage 5 to move to a desired storage compartment 3 by rotating the shaft of the motor 12 in one direction or the opposite direction.

Though not illustrated, the motor 12 and the timing belt 13 are enclosed by a protection coating. Power transmitting means to the shaft 10 is not limited to the timing belt 13. To this end, a chain or a set of gears may be unable. Alternatively, the shaft 10 may be directly rotated by the motor 12.

There is provided a carrier region 15 above the base member 9 of the carriage 5. The carrier region 15 includes supporting strips 15a for supporting the edges of the object W. The surface of the supporting strip 15a and the upper surface of the rail 4 are generally equal in height. Thus, as previously described, the shifting of the object W is easily performed between the carrier region 15 and the storage compartment via the rail 4 in a sliding manner.

As previously described, the shifting units 16 are spaced from each other across the carrier region 15 for pushing away and drawing near the object W. More specific aspects of the shifting units 16 will be described below.

As shown in FIG. 2 for example, two elongated stationary fixing pieces 17 are attached to the base member 9. The fixing pieces extend perpendicularly to the moving direction of the carriage 5. The fixing pieces 17 are spaced from each other with the carrier region 15 present therebetween. Each of the stationary fixing pieces 17 supports a first shifting member 18 for relative movement. In turn, each of the first shifting members 18 supports a second shifting member 19 for relative movement. Basically, the shifting unit 16 is constructed by the stationary fixing piece 17 and the two shifting members 18, 19.

The first and second shifting members 18, 19 of the respective shifting units 16 are synchronously driven by a single motor 20. As shown in FIG. 4, when the first shifting member 18 in moved relative to the stationary fixing piece 17, the second shifting member 19 is also moved relative to the first shifting member 18. In the illustrated embodiment, the displacement of the second shifting member 19 relative to the stationary fixing piece 17 is 2L, while the displacement of the first shifting member 18 relative to the stationary fixing piece 2 is L. With such an arrangement, it is possible to insert the second shifting member 19 into the shelf assembly 2 to a great extent.

Referring to FIGS. 5–11, the specific structure of the shifting unit 16 will be described. FIG. 5 is a sectional view taken along lines 5—5 in FIG. 3, and FIG. 6 is a sectional view taken along lines 6—6 in FIG. 5. FIG. 7 is a sectional view taken along lines 7—7 in FIG. 6, and FIG. 8 is a sectional view taken along lines 8—8 in FIG. 6. FIG. 9 is a perspective view showing an engaging member, and FIG. 10 is a sectional view showing a right-hand half of the shifting unit 16 taken along lines 10—10 in FIG. 6. FIG. 11 is a sectional view showing a left-hand half of the shifting unit 16 taken along lines 10—10 in FIG. 6, and FIG. 12 is a sectional view taken along lines 12—12 in FIG. 11.

As is seen from FIG. 5, the stationary fixing piece 17 is made up by two plates and has an L-shaped cross section. As shown in FIG. 2 for example, the longitudinal ends of the stationary fixing piece 17 are located above the respective rails 4.

Referring to FIG. 5 again, the first shifting member 18 has an elongated (in the direction perpendicular to the paper surface depicting FIG. 5) strip-like form. The longitudinal ends of the first shifting member 18 are connected to respective first brackets 21. An upper guide bar 22 and a lower guide bar 23 are provided to extend between the two first brackets 21.

The stationary fixing piece 17 has a lower horizontal portion 17a. A stationary guiding block 24 is attached to a longitudinally central position of the lower horizontal portion 17a. The guiding block 24 is formed with a through hole into which the lower guide bar 23 is inserted for sliding movement. The guiding block 24 has a rather small length compared with the length of the lower guide bar 23. With such an arrangement, while guided by the stationary guiding block 24, the first shifting member 18 is moved into or away from the shelf assembly 2.

As shown in FIG. 5 (see also FIGS. 3 and 4), the first shifting member 18 has an outer surface or a surface facing the stationary fixing piece 17. A horizontally extending first rack 25 is attached to a lower portion of the above-mentioned outer surface. The length of the first rack 25 is generally equal to that of the first shifting member 18. The teeth of the first rack 25 are arranged to face the fixing piece 17.

A plurality of rollers 26 (only one is shown in FIG. 5) are attached to the fixing piece 17 for supporting the first rack 25. The rollers 26 are spaced from each other by a predetermined distance in the longitudinal direction of the fixing piece 17. The rollers 26 together with the guiding block 24 guide the reciprocating movement of the first shifting member 18.

The stationary fixing piece 17 is formed at its longitudinal central portion with a cutout 27. Due to this cutout, the first rack 25 is visible from outside (from the left-hand side in FIG. 5). An upper and a lower second brackets 28 are attached near the cutout 27 to the outer surface of the fixing piece 17. An upright rotation shaft 29 is supported by these two brackets 28 for rotation. The rotation shaft 29 in turn supports a first pinion 30. Part of the first pinion 30 is inserted through the cutout 27 to be held in mesh with the first rack 25, as shown in FIG. 5. With such an arrangement, the first shifting member 18 is moved relative to the shelf assembly 2 by rotating the first pinion 30.

As shown in FIGS. 3 and 5, both of the fixing pieces 17 support the respective first pinions 30 via the corresponding rotation shafts 29. However, one of the rotation shafts 29 is provided at its lower end with a first sprocket 31 (hereinafter, this shaft is referred to as first rotation shaft), whereas the other rotation shaft 29 (second rotation shaft 29) is provided at its lower end with none. Instead, an idle gear 32 is provided near the fixing piece 17 which is closer to the second rotation shaft 29 (hereinafter, this fixing piece is referred to as second fixing piece, wile the opposite fixing piece, which is closer to the first rotation shaft, is referred to as first fixing piece). The idle gear 32 is arranged to be held in mesh with the first pinion gear 30 supported by the second fixing piece 17. The idle gear 32 is rotated about an upright shaft whose lower end is provided with a first sprocket 31.

Further, an intermediate gear 33 is provided near the first fixing piece 17 for rotation about an upright shaft. The intermediate gear 33 and the two first sprockets 31 are coupled via a first chain 34, while the intermediate gear 33 is coupled via a second chain 35 to the rotation shaft of the motor 20 fixed to the base member 9. In this way, the power of the motor 20 is transmitted to the intermediate gear 33. With such an arrangement upon rotation of the shaft of the motor 20, the two first sprockets 31 are rotated synchronously but in the opposite directions via the first and second chains 34, 35. As a result, the two first shifting members 18 are synchronously moved in the same direction.

As shown in FIG. 5, the second shifting member 19 is an elongated hollow member with a rectangular cross section. The bottom surface of the second shifting member 19 is fixedly provided, at its longitudinally central portion, with a guiding block 37. The guiding block 37 is formed with a through hole into which the upper guide bar 22 is inserted for sliding movement. As previously described, the upper guide bar 22 is fixed to the first shifting member 18. Similarly to the guiding block 24, the guiding block 37 has a relatively small length.

The guiding block 37 supports a roller 38 projecting toward the first shifting member 18. The roller 38 is fitted into a guide frame 39 fixed to the first shifting member 18. The guide frame 39 is elongated, extending substantially over the entire length of the first shifting member 18. Thus, the second shifting member 19 is moved relative to the first shifting member 18, while guided by the upper guide bar 22 and the guide frame 39.

As shown in FIGS. 3–5, each of the first shifting members 18 is provided with two second sprockets 40. The second sprockets are disposed near the respective ends of the first shifting member. Each of the second sprockets 40 has a rotation axis extending in the moving direction of the carriage 5. The two second sprockets 40 are coupled to each other via a third chain 41. A lower portion of the third chain 41 is fixed to a longitudinally intermediate portion of the fixing piece 17 via a lower spacer 42. On the other hand, an upper portion of the third chain 41 is fixed to a longitudinally intermediate portion of the second shifting member 19 via an upper spacer 43.

With an arrangement, as shown in FIG. 4, when the first shifting member 18 is moved upon rotation of the first pinion 30, the third chain 41 is moved together with the first shifting member 18 with the lower spacer 42 positionally fixed. Thus, the third chain 41 is rotated relative to the second shifting member 19. Accordingly, the upper spacer 43 is horizontally moved in the direction going away from the lower spacer 42. At this time, the displacement of the upper spacer 43 is twice as large as the displacement L of the second shifting member 19. Thus, the second shifting member 19 is moved by a distance twice as large as the displacement L of the first shifting member 18. As a result, it is possible to move the second shifting members 19 into the shelf assembly 2 to a great extent.

In FIG. 5, a rotary encoder is indicated by reference numeral 44. The rotary encoder 44 is used to obtain information on the displacement of the second shifting member 19 based on the rotating amount of the first pinion 30. The longitudinal length of the second shifting member 19 is made greater than the maximum length of the side surface of the object W.

As shown in FIGS. 6–13, both ends of the second shifting member 19 are provided with a plate-like engaging member 45 made of a metal material. The engaging member 45 includes a base portion 45a, an intermediate portion 45b extending at a predetermined angle from the base portion 45a and an engaging portion 45c. The base portion 45a is attached to a vertically elongated block 46. The block 46 is formed with a through hole extending longitudinally of the block. The engaging portion 45c extends at a predetermined angle from the intermediate portion 45b and has a relatively large area. The angle made between the engaging portion 45c and the base portion 45a is about 90 degrees.

A vertically elongated shaft 47 is inserted into the through hole of the block 46. Upper and lower brackets 48 are attached to an upper portion and a lower portion of the second shifting member 19, respectively. The shaft 47 is supported by the third brackets 48 for rotational movement. As shown in FIGS. 8 and 12, two torsion springs 49 are fitted around the shaft 47 at locations above and below the block 46, respectively. The torsion springs 49 serve to urge the engaging member 45 to the open position.

As shown in FIGS. 6 and 12, when the engaging member 45 assumes the open position, the intermediate portion 45b is held in contact with the outer plate 19a of the second shifting member 19. Further, the engaging portion 45c projects from the end of the second shifting member 19 and overlaps the fixing piece 17 when viewed from above. The engaging member 45 is designed to be brought to the closed position against the force of the torsion springs 49. In this position, the engaging portion 45c is located above the carrier region 15. Instead of the torsion springs 49, it is possible to use other spring means such as an extension spring, a compression spring, a plate spring and the like.

As shown in FIGS. 5–6 and 10–11, a rotary solenoid 51 is attached to a longitudinally central portion of the second shifting member 19. The rotary solenoid 51 includes a rotor 50 which rotates about a horizontally extending axis. The rotary solenoid 51 is an example of the driving means to actuate the engaging member 45. A second pinion 52 is attached to the rotor 50. As shown in FIG. 10, an upper and a lower sliders 53 are provided, flanking the pinion 52. The sliders 53 have an L-shaped cross section (see FIG. 7) and are horizontally movable. As shown in FIG. 7, each of the sliders 53 is supported for horizontal sliding movement via a guide pin 54. The guide pin 54 is attached to the inner plate 19b of the second shifting member 19. As shown in FIGS. 11 and 12, each slider 53 is attached to a second rack 55. The second racks 55 are held in mesh with the second pinion 52 from above and below the pinion 2.

With such an arrangement, when the pinion 52 is rotated in one or the other directions, the sliders 53 are synchronously moved away from or toward each other.

Each of the sliders 53 is attached to a wedge member 56 to push the base portion 45a of the engaging member 45. The wedge member 56 has a generally trapezoidal form as viewed from above. Upon movement of the glider 53, the wedge member 56 is moved in close sliding contact with the outer plate 19a of the second shifting member 19.

When the rotary solenoid 51 is actuated to slide the slider 53, the wedge member 56 is advanced to push the base portion 45a of the engaging member 45. As a result, the engaging member 45 pivots to assume the closed position, so that the engaging portion 45c projects above the carrier region 15. As shown in FIG. 13, when the advance of the wedge member 56 comes to an end, the engaging portion 45c is held in a position where it extends perpendicularly from the end of the second shifting member. At this stage, the wedge member 56 is tightly held between the base portion 45*a* of the engaging member 45 and the outer plate 19*a* of the second shifting member 19. When the wedge member 56 is moved in the reverse direction, the engaging member 45 is brought back to the initial position or the open position due to the urging force of the torsion springs 49.

In this embodiment, the two engaging members 45 of the second shifting member 19 are synchronously rotated in the same direction by the single rotary solenoid 51. However, a plurality of rotary solenoids 51 may be provided for the engaging members 45 respectively. Both of the rotary solenoids 51 of the respective shifting units 16 are synchronously actuated so that the engaging members 45 of the respective shifting units 16 are synchronously rotated. The driving means to actuate the engaging members 45 is not limited to a rotary solenoid 51. Other driving means may be usable such as an electromagnetic solenoid having a linearly movable rod, a step motor and the like.

Referring to FIG. 14, when the object W to be stored is shifted from the carriage 5 to the shelf assembly 2, first each of the engaging members 45 is caused to assume the closed position and then the shifting units 18, 19 are advanced or moved toward the shelf assembly 2. In this way, the object W is pushed forward by the engaging members 45 attached to the trailing ends of the respective second shifting members 19. As a result, the object W is caused to slide into a storage compartment 3. After the object W is properly placed in the storage compartment 3, the engaging members 45 are caused to assume the open position, and then the shifting units 18, 19 are reversely moved.

On the other hand, when the stored object W is shifted from the shelf assembly 2 to the carriage 5, the shifting units 18, 19 are advanced into the storage compartment 3 with the engaging members 45 held in the open position. Thereafter, the engaging members 45 are rotated to assume the closed position, and then the shifting units 18, 19 are reversely moved. In this way, the object W is engaged by the engaging members 45 attached to the leading ends of the respective second shifting members 19, while the shifting units 18, 19 are reversely moved. As a result, the object W is moved from the storage compartment 3 onto the carriage 5 in a sliding manner. The shifting of the object W between the lift 7 (see FIG. 1) and the carriage 5 is similarly performed.

During the shifting of the object W described above, the wedge member 56 is held between the base portion 45*a* of the engaging member 45 and the outer plate 19*a* of the second shifting member 19, as illustrated in FIG. 13. As a result, each engaging member 45 is firmly held in the closed position, so that the shifting of the object W is properly performed. Further, the external force applied on the engaging members 45 is advantageously prevented from acting on the sliders 53 and the rotary solenoid 51. Thus, the driving means for actuating the engaging members 45 are properly protected.

The prior art shown in FIG. 95 has a disadvantage on its small width of the engaging member 171. On the other hand, the engaging member 45 of the present invention includes an engaging portion 45*c* having a large area. Thus, each engaging member 45 comes into contact with the object W through a relatively large contact area. As a result, the shifting of the object W is reliably performed, even if the object W is a fragile one such as a cardboard box for example.

Further, even if the object W placed on the carriage 5 is positionally deviated toward the shelf assembly 2 for example, it is possible to correct the position of the object W by the closing movement of the engaging members 45. Thus, the shifting of the object W is reliably performed even if there is such a deviation.

In the first embodiment, two shifting members are included in each shifting unit. However, the shifting unit may be made up by only one shifting member or more than two shifting members.

(2) Second Embodiment (FIG. 15)

FIG. 15 shows a second embodiment of the present invention. In this embodiment, the engaging members 45 are driven by different electromagnetic solenoids 58, respectively. The solenoid 58 includes a linearly movable rod 58*a*.

The engaging member 45 is not necessarily actuated by the push of the wedge member 56. For instance, the engaging member 45 may be directly actuated by the rod 58*a* of the solenoid 58. Alternatively, the rotation shaft of the engaging member 45 may be directly connected to the rotor of the rotary solenoid. In this way, the engaging member 56 is directly actuated by the rotary solenoid.

(3) Third Embodiment (FIG. 16)

FIG. 16 illustrates another example of driving member to actuate the engaging member 45 according to a third embodiment. In this embodiment, the rotation shaft 59 of the engaging member 45 is provided with a gear portion 59*a*. The gear portion 59*a* is held in mesh with a worm 60 which may be rotated by a motor, a rotary solenoid and the like. With such an arrangement, even when some moment is applied on the engaging member 45 during the shifting operation of the object W, the external force resulting from the moment will act on the worm 60 longitudinally thereof, so that the worm 60 is not rotated by the external force. Thus, the engaging member 45 is reliably held in the closed position.

(4) Fourth Embodiment (FIGS. 17–43)

A fourth embodiment of the present invention will be described below with reference to FIGS. 17–43. For this embodiment and the following embodiments, no description will be made to the members, units and the like which perform the same functions and have the same construction as those of the first embodiment. Further, the same elements will be indicated by the same references.

The basic arrangements of the storage-retrieval system 1 are similar to those of the system described in connection with the first embodiment. Specifically, as shown in FIG. 17, a pair of shelf assemblies 2 are arranged to face each other, and a plurality of pairs of rails 4 at different heights and a carriage 5 are disposed between the two shelf assemblies 2. Each of the illustrated shelf assemblies 2 includes horizontally extending shelf plates 62 disposed at different heights. Thus, a large number of object W are placed on a single shelf plate 62. Though not shown, each shelf plate 62 is provided with partitions suitably spaced from each other.

The carriage 5 according to the forth embodiment has basic arrangements similar to those of the first embodiment. Hereinafter, differences between those two embodiments will be mainly described.

As shown in FIGS. 18, 20 and 21, each of the fixing members 17 is attached to fourth brackets 64 via bolts 65. The fourth brackets 64 are fixed to an inner surface of the base member 9 via bolts 63. The fixing member 17 is constructed by a single metal plate and has a generally L-shaped cross section. The fixing member 17 has a lower horizontal portion 17*a*. Part of the lower horizontal portion 17*a* is bent to provide a guide piece 17*b* for positioning the object W. As shown in FIG. 23, the carrier region 15 is made up by a plate 66. The plate 66 is large enough to store various objects W with different sized bottom surfaces.

In the first embodiment, the idle gear 32 is supported by the fixing member 17 which is further from the motor 20 than the other fixing member. However, in the fourth embodiment, an idle gear 32 is supported by the fixing piece 17 which is closer to the motor 20. The idle gear 32 is supported by supporting members 67 fixed to the fixing member 17. Further, in the fourth embodiment, the motor 20 for reciprocating movement is attached to the outer surface of the fixing member 17 via a fifth bracket 68. The rotation shaft of the motor 20 is provided with a main sprocket 69. The two first sprockets 31 and the main sprocket 69 are coupled by a first chain 34. As On in FIGS. 23, 25, a rotary encoder 44 is attached to the lower end of the rotation shaft 70 of the first pinion 30.

A first shifting member 18 is made into a channel-like shape open to the fixing member 17. A first rack 25 is attached to a suitable portion of the first shifting member 18, as shown in FIG. 25. The first rack 25 is held in mesh with the first pinion 30.

As shown in FIGS. 25 and 27, the upper inner surface and the lower inner surface of the first shifting member 18 are provided with a first guide rail 71. The first guide rail 71 has a triangular cross section and extends substantially over the entire length of the first shifting member 18. The upper and lower first guide rails 71 are held in engagement with first guide rollers 72. Each of the guide rollers is attached to the fixing member 17 and provided with a V-shaped channel extending circumferentially of the roller. As shown in FIG. 27, a plurality of first guide rollers 72 are disposed longitudinally of the fixing member 17, spaced from each other by a predetermined distance. With such an arrangement, the first shifting member 18 which is guided by the first guide rails 71 and the first guide rollers 72, is moved longitudinally of the same unit.

As shown in FIGS. 23 and 25, the second shifting member 19 is made into a channel-like form which in use is open to the carrier region 15. The second shifting member 19 has an upright surface facing the first shifting member 18 (see FIG. 25). An upper and a lower second guide rails 73 are attached to the upright surface of the second shifting member 19. The second guide rails 73 have a triangular cross section. A plurality of second guide rollers 74 are attached to the first shifting member 18. The attached second guide rollers 74 are disposed longitudinally of the first shifting member 18 and spaced from each other by a predetermined distance. The second guide rails 73 are arranged to come into fitting engagement with the second guide rollers 74. With such an arrangement, the second shifting member 19 is moved relative to the first shifting member 18, while advantageously guided by the second guide rails 73 and the second guide rollers 74.

As shown in FIGS. 23 and 25, the first shifting member 18 is provided with an extension 18a projecting downward. Each of the horizontally opposite ends of the extension 18a is provided with a second sprocket 40. The two sprockets 40 are coupled via a second chain 35. The second chain 35 is fixed at two portions (see FIG. 26) to the fixing member 17 and the second shifting member 19, respectively, like the first embodiment. Due to such an arrangement, the second shifting member 19 is displaced by a distance twice as great as the displacement of the first shifting member 18 (see FIG. 28).

As shown in FIG. 24, the first sprocket 31 is fixed to the rotation shaft 75 with a nut 76. With such an arrangement, it is possible to perform fine adjustment of the circumferential position of the teeth of the first sprocket 31. Thus, the two first shifting members 18 are advantageously moved in an exactly synchronized manner.

Referring to FIGS. 29–38, arrangements relating to the engaging member 45 will be described. FIG. 29 is a per-
spective view showing a central portion of the shifting unit 16. FIG. 30 is a perspective view showing an end portion of the shifting unit 16. FIG. 31 is a front view showing the central portion of the shifting unit 16. FIG. 32 is a sectional view taken along lines 32—32 in FIG. 31. FIG. 33 is a front view showing an end of the shifting unit 16. FIG. 34 is a sectional view taken along lines 34—34 in FIG. 33. FIG. 35 is a sectional view taken along lines 35—35 in FIG. 34. FIG. 36 is a sectional view taken along lines 36—36 in FIG. 33. FIG. 37 is a perspective view showing the fixing portion for the engaging member. FIG. 38 is a sectional plan view showing the engaging member in a partially actuated state, and FIG. 39 is a sectional plan view showing the engaging member held in the closed position.

As shown in FIGS. 29, 31, 32, a sixth bracket 77 is attached to a longitudinally central portion of the second shifting member 19. The sixth bracket 77 includes a pair of side plates 77. A screw shaft 78 is supported by the sixth bracket 77 for rotational movement. The axis of the attached screw shaft 77 is parallel to the longitudinal direction of the second shifting member 19. As shown in FIG. 29, a slider 79 is held in mesh with the screw shaft 78.

The slider 79 is supported by a guide shaft 80 for sliding movement. The guide shaft 80 is fixed to the sixth bracket 77. The sixth bracket 77 carries a motor 81 for actuating the engaging member. The power of the motor 81 is transmitted to the screw shaft 78 via a pair of gears 82. With such an arrangement, upon actuation of the motor 81, the screw shaft 78 is rotated, thereby moving the slider 79 in the longitudinal direction of the second shifting member 19. As shown in FIGS. 29 and 32 for example, the slider 79 supports a link member 83 which extends toward the engaging members 45 at the both ends of the second shifting member 19.

The engaging member 45 of this embodiment has the same arrangements as those of the engaging member 45 of the first embodiment. For instance, an upper and a lower parts of the base portion 45a of the engaging member 45 are respectively provided with brackets 84, and a vertically extending shaft 47 is supported by these brackets.

As shown in FIGS. 30 and 33–35, the upper inner surface and the lower inner surface of the second shifting member 19 are respectively provided with elongated linear sliders 87. The longitudinal direction of the linear slider 87 coincides with that of the second shifting member 19. The linear slider 87 is made up by a stationary portion 85 and a movable portion 86. The movable portions 86 of the respective linear sliders 87 support the shaft 47 for rotational movement.

The linear sliders 87 enable the engaging member 45 to move longitudinally of the second shifting member 19. As shown in FIGS. 30 and 34, the linear sliders 87 are positionally offset toward the carrier region 15. The upper and lower inner surfaces of the second shifting member 19 are respectively provided with rear stoppers 88. These rear stoppers serve to limit the reverse movement of the movable portions 86 of the respective linear sliders 87.

As is easily seen from FIGS. 34 and 35, the upper and lower inner surfaces of the second shifting member 19 are also provided with channel-shaped guide members 89, respectively. The guide members 89 are disposed between the upright side surface of the second shifting member 19 and the linear sliders 87. Between the guide members 89 is provided a vertically extending rod 90 (see also FIG. 37). The upper and lower ends of the rod 90 are provided with guide rollers 91' and pressing rollers 91". The guide rollers 91' are arranged to be fitted into the upper and lower guide members 89, whereas the pressing rollers 91" are arranged to come into contact with the base portion 45a of the engaging member 45. These rollers 91' and 91" are rotatable about a vertical axis extending through the rod 90.

As shown in FIGS. 35–37, the rod 90 supports a back plate 93. The rod 90 has a flat side surface facing the upright plate of the second shifting member 19, and the back plate 93 is attached to this side surface. An upper and a lower portions of the back plate 93 respectively support guide rollers 92. Each guide roller 92 is held in contact with the bottom surface of a corresponding guide member 89. The back plate 93 also supports a movable bracket 94 extending toward the center of the second shifting member 19. The movable bracket 94 supports one of the ends of the link member 83. As is easily understood, the other movable bracket (not shown) provided at the opposite end of the second shifting member 19 supports the other end of the link member 83.

As shown in FIGS. 30, 33, 36, an extension spring 95 is provided between the movable bracket 94 and the base portion 45a of the engaging member 45.

With such an arrangement, upon actuation of the motor 81, the driving force of the motor 81 will move the link member 83, the bracket 94 and the back plate 93. As a result, the guide rollers 92 are moved along the guide members 89, while the pressing rollers 91" are advanced to push the engaging member 45. Thus, the engaging member 45 is moved toward the corresponding end of the second shifting member 19.

As shown in FIGS. 30 and 36, the second shifting member 19 is provided with front stoppers 96 for limiting the advancement of the movable portions 86 of the linear sliders 87. The front stoppers 96 are attached to an upper inner surface and a lower inner surface of the second shifting member 19. In this instance the movable portion 86 of the linear slider 87 has a front end formed with a projection, while the front stopper 96 has a rear end formed with a recess. The projection is arranged to fit into the recess. Thus, when the engaging member 45 is advanced and the projection is received in the recess, the engaging member 45 is positionally secured. Further, a vertically extending stopper pin 97 is provided between the upper and lower front stoppers 96. The stopper pin 97 serves to control the pivoting of the engaging member 45, as will be described hereinafter.

The movable distance L2 of the pressing roller 91" (or the movable distance of the slider 79) is set to be greater than the movable distance L1 of the movable member 86 (see FIG. 36). Thus even after the advance of the engaging member 45 is stopped by the stoppers 96, the pressing rollers 91" continue to move forward. It should be noted that the pressing roller 91" corresponds to the wedge member 56 of the first embodiment, and that the pressing roller 91" may be replaced with a suitable block member.

As shown in FIG. 36, when the pressing roller 91" is located at a backward position (or a standby position), the engaging member 45 is held in the open position due to the action of the extension spring 95. In this state, the engaging portion 45c of the engaging member 45 is accommodated in the second shifting member 19.

As the pressing rollers 91" are driven forward while the motor 20 is actuated, these pressing rollers continue to push the engaging member 45, as shown in FIG. 38. During this operation, due to the action of the extension spring 95, the engaging member 45 does not change its orientation until the movable portion 85 of the linear slider 87 comes into contact with the front stopper 96.

Then, when the pressing rollers 91" continue to move forward while the engaging member 45 is prevented from advancing, the base portion 45a of the engaging member 45 is further pushed by the pressing rollers 91". As a result, the engaging member 45 is caused to pivot about the vertical shaft 47. When the pressing rollers 91" come to an end of their forward movement, the engaging member 45 is brought to the closed position, in which the engaging portion 45a of the engaging member 45 extends perpendicularly to the second shifting member 19, as shown in FIG. 39. In this state, the engaging member 45 cannot be rotated due to the stopper pin 96 and the pressing rollers 91". Like the wedge member 56 of the first embodiment, the pressing rollers 91" are an example of locking means for holding the engaging member 45 in the closed position.

The engaging member 45 of this embodiment is arranged to be withdrawn, unlike that of the first embodiment. Thus, the shifting unit 16 of this embodiment can be produced more compact, while the movable distance or displacement of the second shifting member 19 is the same for this embodiment and the first embodiment. Another advantage obtainable from the present embodiment is that the displacement of the engaging member 45 can be made greater. Accordingly, a larger object W can be handled.

According to the embodiment, the engaging members 45 are attached to the both ends of a single slider 79. Thus, the two engaging members 45 are moved in the opposite direction. Specifically, as shown in FIG. 18, one of the engaging members 45 advances, while the other engaging member 45 retreats. With such an arrangement, when the object W is shifted from the shelf assembly to the carriage 5, and further to the lift 7 (see FIG. 1) there is no need to actuate the engaging members 45 again. Thus, the controlling system is advantageously simplified.

As described above, the second shifting member 19 is movable. Therefore, various cables and cords connected to the motor 81 to actuate the engaging members, controlling sensors and the like should be flexible. In this instance, arrangements should be made so that the cables and cords will not interfere with the shifting of the object W. To this end, those cables and cords are protected by a flexible cover 99 part of which is shown in FIG. 25. More specific description about this will be given below with reference to FIGS. 40–43.

FIG. 40 is a schematic sectional view taken along lines 40—40 in FIG. 25. FIG. 41 is a perspective view showing part of a flexible cover 99. As shown in FIG. 41, power lines and signal lines are collected and formed into a single flexible flat cable 100. The flexible cover 99 is constructed by a plurality of cover pieces 101. These cover pieces are connected to each other for bending. Each cover piece 101 is provided with a pin 102 for preventing the flat cable 100 inserted into the flexible cover 99 from coming off.

As shown in FIG. 40, one end of the flexible cover 99 is connected to the fixing member 17, whereas the other end of the flexible cover is connected to the second shifting member 19. In the illustrated instance, the connected ends of the flexible cover 99 are located offset in the same direction from the longitudinal center O of the fixing member 17 and the second shifting member 19.

When the second shifting member 19 is moved in the direction shown in FIG. 42, the flexible cover 99 is advantageously supported by the elf plate 62. When the second shifting member 19 is moved in the apposite direction shown in FIG. 43, the flexible cover 99 is hung by the second shifting member 19. In either case, the flexible cover 99 is smoothly flexed without get entangled or meandering. Thus, it is possible to prevent the flexible cover 99 from obstructing the shifting operation for the object W to be transferred.

According to the fourth embodiment, the motor 20 is attached to the fixing member 17. In this way, the motor 20 and the members 17–19 can be provided as a single unit. This arrangement advantageously facilitates the assembling of the carriage 1.

(5) Fifth Embodiment (FIGS. 44 and 45)

FIG. 44 illustrates a fifth embodiment which is a modified version of the fourth embodiment. The fifth embodiment is characterized by an engaging member 45 arranged to perform the pivoting about a vertical axis and the advancing movement simultaneously.

In the fifth embodiment, a seventh bracket 103 is attached to an inner surface of the second shifting member 19 (see FIG. 44). An extension spring 95 is provided, bridging between the seventh bracket 103 and the base portion 45a of the engaging member 45. With such an arrangement, when the engaging member 45 is pushed forward by the pressing rollers 91", the elastic restoring force of the spring 95 increases. Therefore, the engaging member 45 is caused to pivot while at the same time being pushed by the pressing rollers 91". the pivoting of the engaging member 45 is controlled by a stopper pin 97.

With the arrangements according to the fifth embodiment, as is easily seen from FIG. 45, there is no need to provide a large space behind the object W for the engaging member 45 to pivot. Thus, the thickness L3 of the shelf assembly 2 is advantageously reduced.

(6) Sixth Embodiment (FIGS. 46–52)

A sixth embodiment of the present invention will be described below with reference to FIGS. 46–52. The gist of the sixth embodiment resides in a controlling system for the shifting unit 16.

Figure 46:
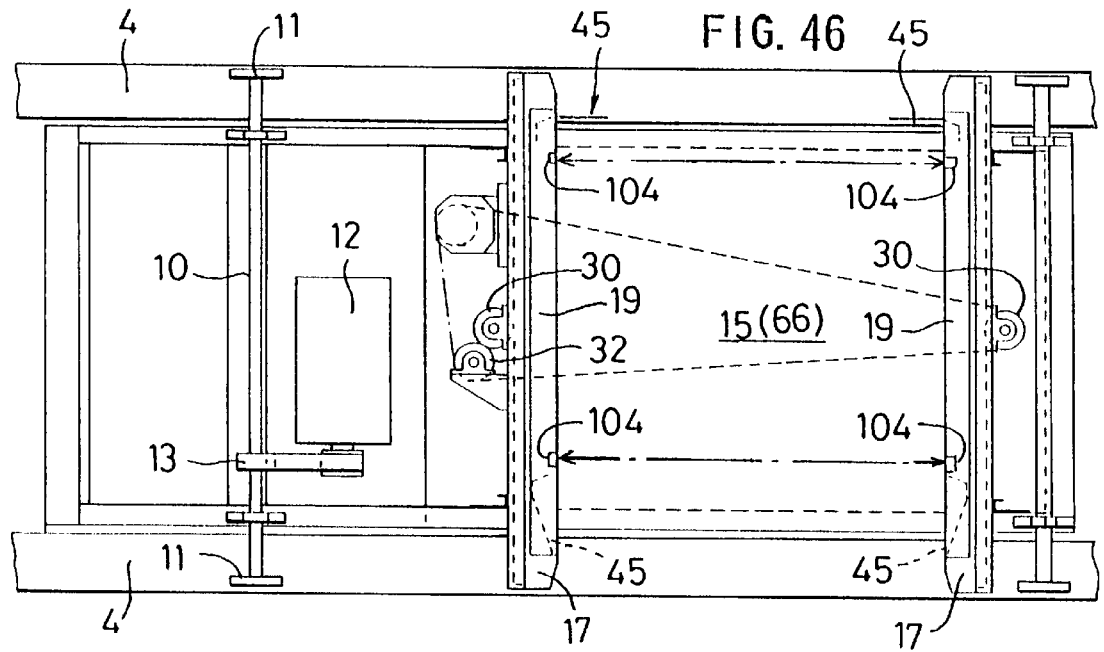

As shown in FIG. 46, the carriage according to the sixth embodiment also has a pair of second shifting members 19 (the left-hand member and the right-hand member as viewed in FIG. 46). An end portion of the left-hand second shifting member 19 is provided with a sensor element 104 (the upper element as viewed in the same figure), while the other end portion is provided with a sensor element 104 (the lower element as viewed in the same figure). Correspondingly, an end portion of the right-hand second shifting member 19 is provided with a sensor element 104 (the upper element as viewed in the same figure), while the other end portion is provided with a sensor element 104 (the lower element as viewed in the same figure). The upper sensor element 104 of the left-hand second shifting member and the upper sensor element 104 of the right-hand second shifting member work together. (This pair of the sensor elements is referred to as the first sensor pair). The lower sensor element 104 of the left-hand second shifting member and the lower sensor element 104 of the right-hand second shifting member work together. (This pair of the sensor elements is referred to as the second sensor pair). Of these, the upper and lower elements of the left-hand shifting member 19 may be a light-projecting device, whereas the upper and lower elements of the right-hand shifting member 19 may be a detector for the light.

With such an arrangement, when the second shifting members 19 are synchronously reciprocated, the two sensor pairs scan the entire carrier region 15 to determine whether the object W is placed there or not.

Based on information obtained from the above sensor pair, it is possible to perform the following controlling manners (a)–(f) for example.

Figure 47:
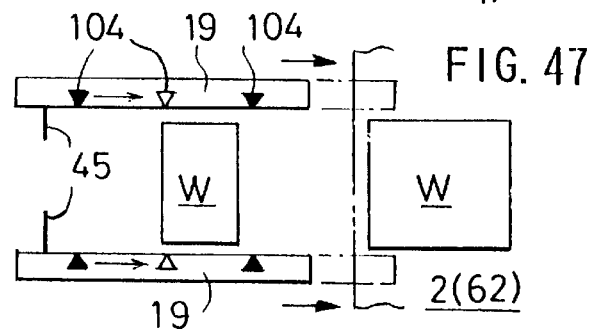

(a) It is assumed, referring to FIG. 47, that the right-hand object W is about to be shifted from the shelf assembly 2 onto the carriage 1 and that the carriage 1 already carries another object W (the left-hand object). If the shifting operation is performed with no suitable measures taken, the right-hand object W will bump into the left-hand object W.

However, according to the sixth embodiment, the above-mentioned sensors are mounted on the second shifting members 19. Thus, upon detection of the left-hand object W, the movement of the shifting members 18, 19 is advantageously stopped. A warning device such as a buzzer may be useful to inform the system operator of the unwanted situation.

In the above arrangement, two pairs of sensors 104 are provided on the second shifting members 19, and suitably spaced from each other. Thus, the carrier region 15 is entirely scanned so that even a small object is detected.

(b) As previously described in connection with the first and fourth embodiments, the direction and the displacement of the movement of the second shifting members 19 are known from the information supplied by the rotary encoder 44 (see FIGS. 4 and 25).

Figure 48:
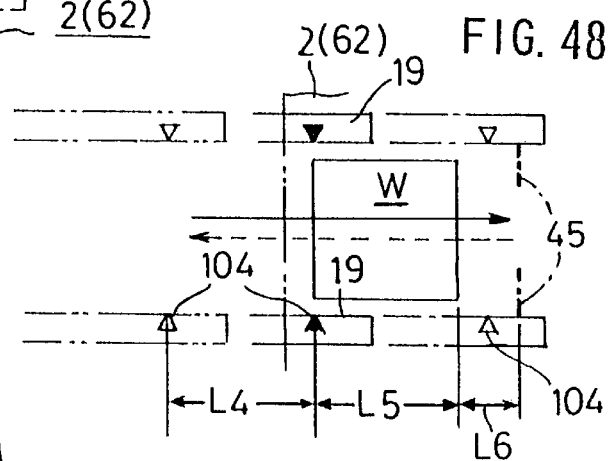
Figure 49:
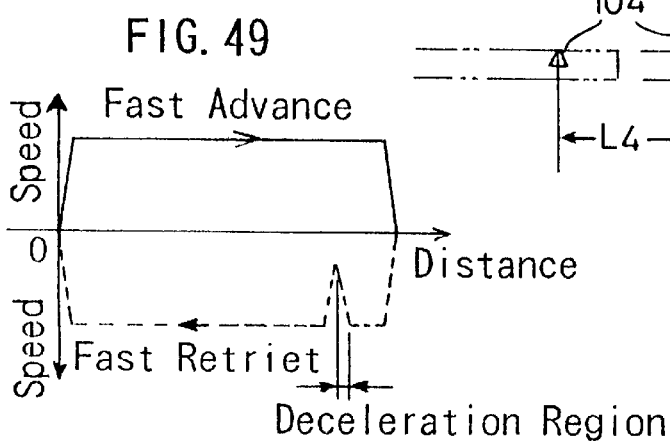

With such an arrangement, referring to FIG. 48, it is possible to know the displacement L4 of the second shifting members 19 moved from the initial position indicated by two-dot chain lines to an intermediate position indicated by solid lines. This intermediate position is described as a position where the front end of the object W is detected. Similarly, it is possible to know the displacement (L4+L5) of the second shifting members 19 moved from the initial position to another intermediate position (not shown). This intermediate position is described as a position where the rear end of the object W is detected. The length L5 of the object W in the reciprocating direction is known by subtracting the displacement L4 from the displacement (L4+L5). To know the length L5 of the object W has the following advantages.

Specifically, once the length L5 of the object W is measured in the above manner, the length L5 is stored in the memory of a suitable control unit. Thereafter, in performing the shifting operation between the shelf assembly 2 and the carriage 5, the movement of the second shifting members 19 is advantageously controlled in accordance with the stored data of the length L5, so that the displacement of the shifting members 18, 19 is minimized.

(c) For the engaging members 45 to assume the closed position by properly pivoting behind the object W as shown in FIG. 48, it is necessary to provide a suitably large space behind the object W. In this regard, since the rear And of the object W can be detected by the sensors during the advancing operation of the second shifting members 19, the rearward displacement of the second shifting members 19 is advantageously minimized. In this way, an unduly great displacement of the shifting members 18, 19 behind the object W, thereby improving the efficiency of shifting the object W.

Further, the displacement of the second shifting members 19 moved from the initial position to the terminal position indicated by one-dot chain lines is known from the information given by the encoder. The distance between the pivoting axis of the engaging member 45 and the sensor element is constant. From these data, it is also possible to know the distance L6.

When the distance L6 is known, the following controlling manner is possible. Specifically, as shown by solid lines in FIG. 49, the entire advancing movement of the second shifting members 19 is performed at fast speed. However, in the retreating movement of the second shifting members 19, the speed of the object W is decelerated immediately before the object W. Thus, the engaging members 45 are brought into contact with the object W gently. Then, the second shifting members 19 are moved at fast speed again.

As described above, according to the present embodiment, wasteful movement of the second shifting members 19 is avoided, and the engaging members 45 can be brought into gentle contact with the object W. As a result, the object W is advantageously presented from suffering unfavorable deformation or damage. Further, the engaging members 45 and the second shifting members 19 can be used for a longer time.

Figure 50:
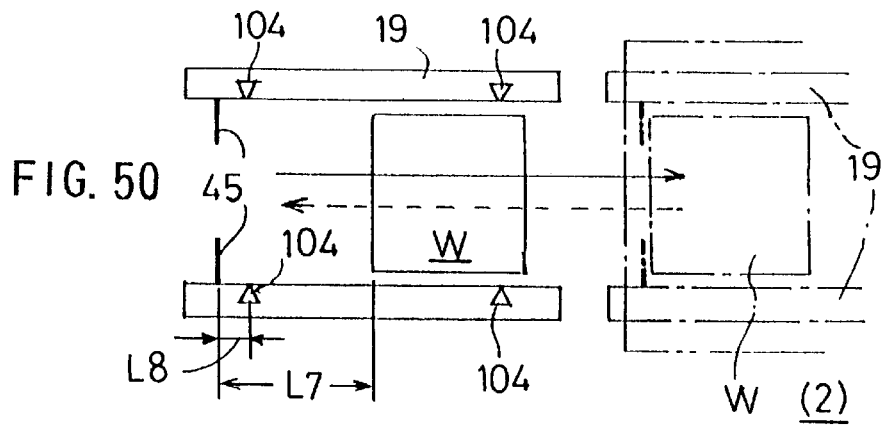

(d) It is supposed that the object W once shifted onto the carriage 1 is about to be pushed onto the lift 7 by the other pair of engaging members 45, as shown in FIG. 50.

As previously described, the length L5 (see FIG. 48) of the object W is known by calculation, and the distance between the two engaging members 45 mounted on each second shifting member 19 is a predetermined constant. Therefore, it is possible to calculate the distance L7 between the above-mentioned other engaging member 45 and the front end of the object W.

Figure 51:
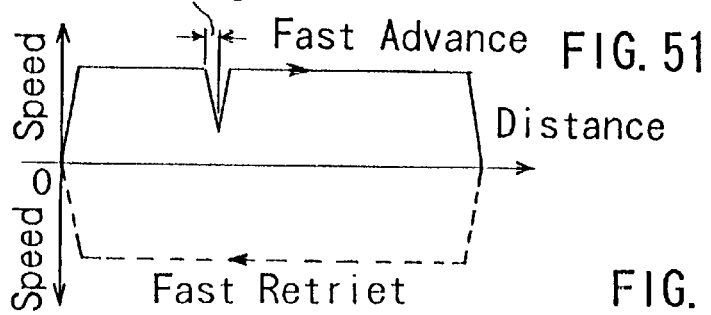
Figure 52:
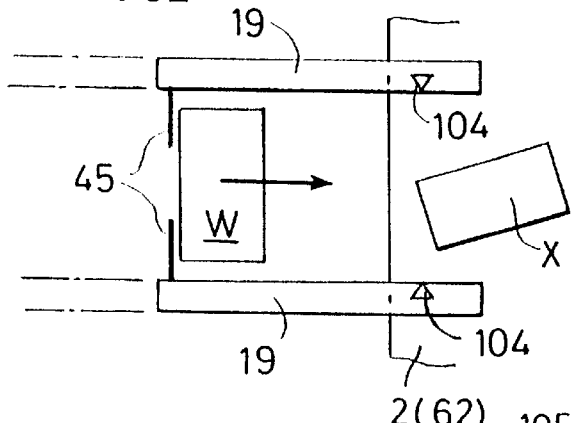

Therefore, as shown in FIG. 50, in shifting the object W previously placed on the carriage 5 into the shelf assembly 2 by the other (left-hand) pair of engaging members 45, the engaging members 45 are moved at high speed to a point immediately before the front surface of the object W and decelerated to contact the object W, as shown by slid lines in FIG. 51. Then the engaging member 45 are moved at high speed again to shift the object W onto the shelf assembly 2. After the object W is properly placed, the engaging members 45 are reversely moved at high speed (broken lines). In this way, the object W is advantageously prevented from suffering unfavorable deformation or damage. Further, the engaging members 45 can be used for a longer time.

(e) It is supposed that the object W on the carriage 5 is about to be pushed by the left-hand engaging members 45, as shown in FIG. 50. In such an instance, the right-hand pair of sensors 104 performs detection of the front surface of the object W before the left-hand engaging members 45 contact the object W. The distance L8 between the left-hand sensors 104 and the left-hand engaging members 45 is a predetermined constant. Thus, the distance L7 for the left-hand engaging members 45 to go until the same engaging members contact the object W is calculated, by the controlling system, based on information obtained by the above-mentioned detection of the front surface of the object W. Based on this calculation, the second shifting members 19 can be decelerated immediately before the engaging members 45 contact the object W.

(f) It is supposed that an obstacle X such as a tool box for example is left behind on the shelf assembly 2. In such an instance, if the object W is shifted onto the shelf assembly 2 without taking suitable measures, a trouble may occur.

However, according to the sixth embodiment, the obstacle X is detected by the right-hand sensors 104 when the second shifting members 19 are advanced into the shelf assembly 2. Thus, it is possible to stop the movement of the shifting members 18, 19 immediately after the presence of the obstacle X is known.

Figure 53:
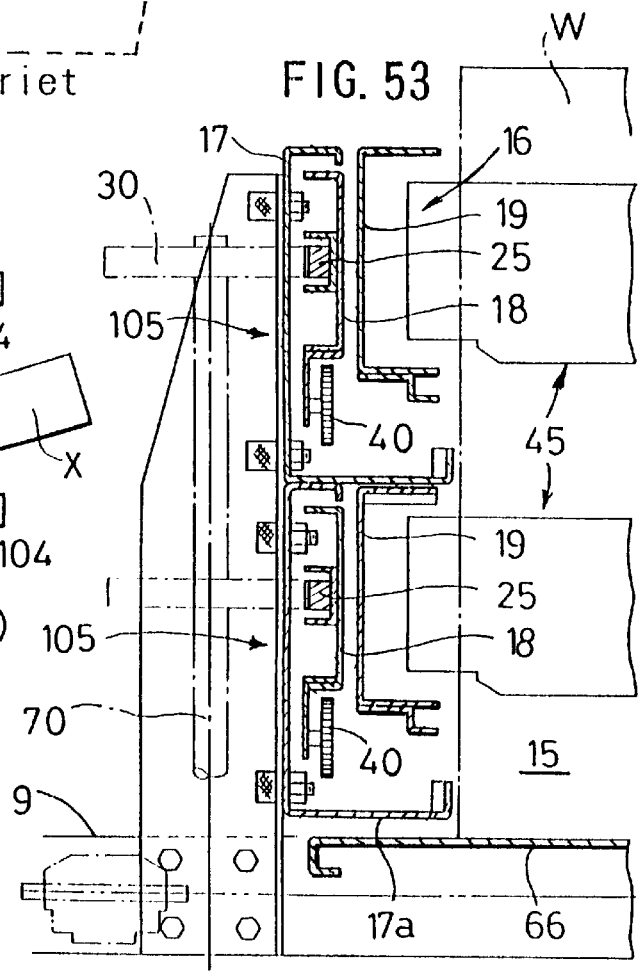
FIG. 53 is a sectional view showing the seventh embodiment.

(7) Seventh Embodiment (FIG. 53)

FIG. 53 illustrates a seventh embodiment which is capable of dealing with objects W different in height.

According to this embodiment, a fixing member 17, shifting members 18, 19, engaging members 45 and other suitable elements are treated as a unit 105. A plurality of such units are vertically fixed to a fourth bracket 64. With such an arrangement even a relatively high object W is properly shifted between the carriage 5 and the shelf assembly 2.

A motor 20 for reciprocating the shifting members may be mounted on each unit 105. In this case, the shifting members of the respective units may be driven synchronously or independently. Alternatively, a single motor 20 may be provided for all of the units 105. In such an instance, the motor 20 may be mounted on the lowest unit 105 and used to rotate a shaft 70. The shaft supports first pinions 30 corresponding to the respective units 105, as shown by one-dot lines in FIG. 53.

(8) Eighth Embodiment (FIGS. 54–68)

An eighth embodiment will be described below with reference to FIGS. 54–68.

Figure 54:
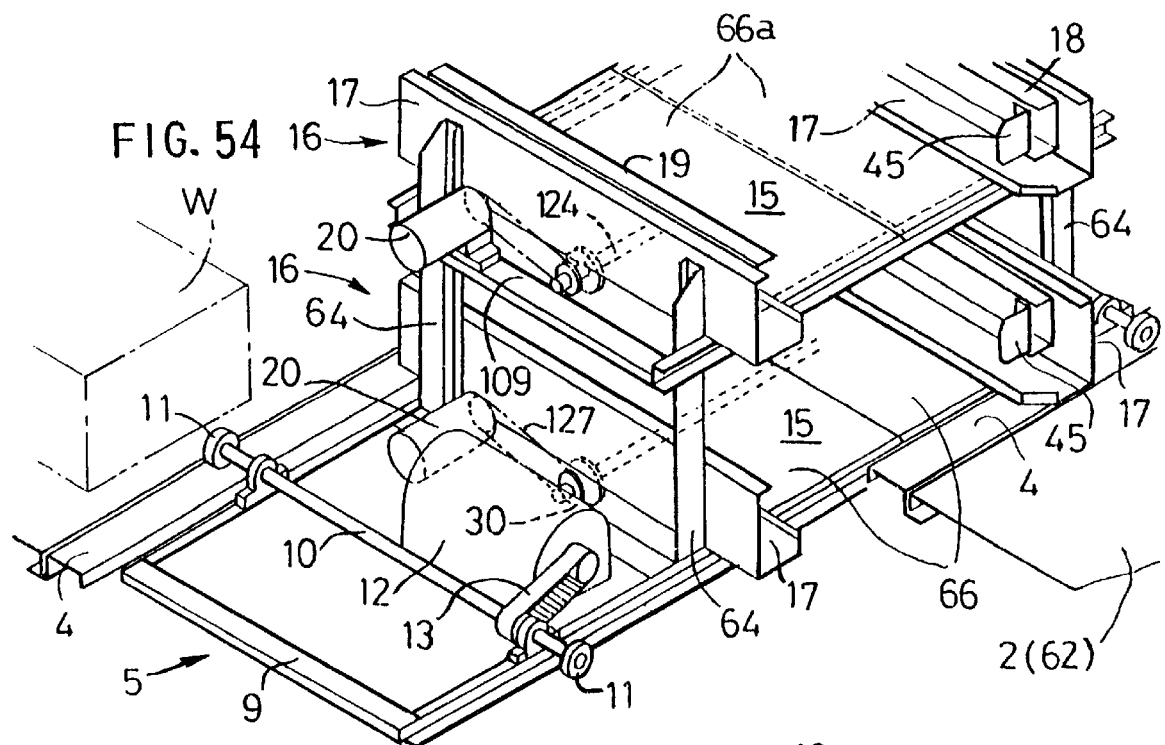
FIG. 54 is a perspective view showing a carriage according to the eighth embodiment.
Figure 55:
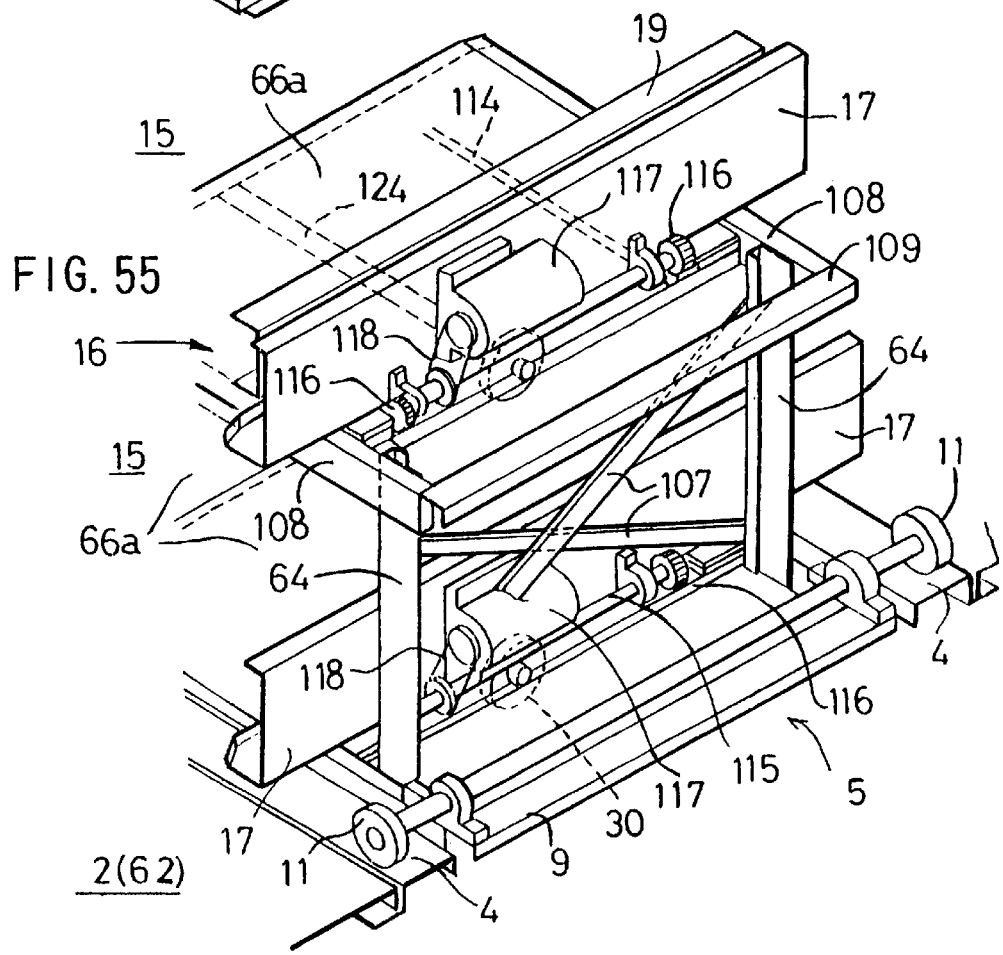
FIG. 55 is a perspective view showing the carriage.

FIGS. 54 and 55 are respective vies showing principal parts of a carriage 5 according to the eighth embodiment. FIG. 56 is a schematic view showing part of driving system. FIG. 57 is a plan view showing the carriage. FIG. 58 is a sectional view taken along lines 58—58 in FIG. 57. FIG. 59 is a sectional view taken along lines 59—59 in FIG. 57. FIG. 60 is a sectional view taken along lines 60—60 in FIG. 57. FIG. 61 is a sectional view taken along lines 61—61 in FIG. 57. FIG. 62 is a sectional view taken along lines 62—62 in FIG. 61. FIG. 63 is a plan view showing principle parts of the carriage. FIG. 64 is a sectional view taken along lines 63—63 in FIG. 62. FIG. 65 is a sectional view taken along lines 65—65 in FIG. 63. FIG. 66 is a sectional view taken along lines 66—66 in FIG. 63. FIG. 67 is a sectional view taken along lines 67—67 in FIG. 63. FIG. 68 is a plan view showing a lift. FIG. 69 is a view taken along lines 69—69 in FIG. 68.

The eighth embodiment includes two carrier regions 15 arranged vertically and two pairs of shifting units 16 each pair flanking corresponding one of the carrier regions. The carrier region 15 is arranged to be variable in width. In other words, the distance between the shifting units 16 is variable. With such an arrangement, objects W differing in width are properly handled. In the present embodiment, the upper and lower shifting units 16 are separately moved. An adjusting mechanism is also provided for controlling the width of the carrier region 15 (or the distance between the two shifting units 16).

As shown in FIGS. 54 and 55, the base member 9 of the carriage 5 includes a base frame. The frame 9 supports four fourth brackets 64 extending upward like in the sixth embodiment. The four brackets 64 correspond in location to the four corners of the two carrier regions 15. The upper and lower carrier regions 15 correspond to an upper and a lower shelves 62, respectively. With such an arrangement, the carriage 5 can perform the shifting operation of the objects W for two shelves fixed at different heights.

As shown in FIGS. 55 and 60, the two fourth brackets 64 spaced along the fixing member 17 are bridged by an X-shaped reinforcing member 107. Further, as shown in FIGS. 55, 56, 58 for example, each pair of the fourth brackets 64 spaced in the moving direction of the carriage 5 have their upper ends bridged by a first reinforcing member 108. Both ends of the respective first reinforcing members 108 are bridged by second reinforcing members 109. As shown in FIGS. 57 and 58, the intermediate portions of the respective first reinforcing members 108 are bridged by a third reinforcing member 110.

As shown in FIG. 56, in the eighth embodiment, the width of the carrier region 15 (ie, the distance between the two shifting units 16) is varied by moving the right-hand shifting unit 16 for example in the longitudinal direction of the first reinforcing members 108. (Details of a driving mechanism for the shifting unit 16 will be described hereinafter.)

The support bottom of the carrier region 15 is arranged as follows in order to make the width of the carrier region 15 variable. Specifically, as shown in FIGS. 54–55 and 57–59, the support bottom of the carrier region 15 includes two support plates 66a. One of the support plates 66a is attached to one of the fixing member 17, while the other of the plates 66a is attached to the other fixing member 17. As best shown in FIG. 59 the two support plates 66a are arranged in an overlapping manner. Thus, the support plates 66a do not mutually interfere when displaced horizontally relative to each other. In this arrangement, there is a difference in height between the two support plates 66a. However, the thickness of each support plate 66a is so small (about 1 mm for example) that the object W is stably supported.

Of two fixing members 17, the fixing member 17 closer to the motor 12 is connected to a bracket 111. On the other hand, the other fixing member 17 is mounted for sliding movement relative to the frame 9 and the upper first reinforcing member 108. With such an arrangement, it is possible to adjust the width of the carrier region 15. Details about this will be described below.

As shown in FIGS. 57 and 63, a pair of channel-shaped guide rails 112 are fixed to the frame 9 and the upper first reinforcing member 108. The guide rails 112 extend in the longitudinal direction of the track rails 4. As shown in FIG. 66 the sliders 113 fixed to the lower surface of the other fixing member 17 are fitted into the front and rear guide rails 112, respectively, for sliding movement.

The above arrangement makes it possible for the other fixing member 17 to move along the guide rails 112. This means that the distance between the fixing members 17 is variable.

In the above embodiment, only one of the fixing members 17 is moved for adjustment of the width of the carrier region 15. To this end, however, both of the fixing members may be moved.

As shown in FIGS. 63 and 67, front and rear third racks 114 are fixed to the frame 9 and the upper first reinforcing member 108. The third racks 114 extend in parallel to the guide rails 112. The teeth of the third racks are arranged to face upward. On the other hand, the outer surface of the other fixing member 17 supports a rotation shaft 115 via suitable bearings. The shaft 115 extends in the longitudinal direction of the other fixing member 17. Third pinions 116 are fixed to the shaft 115 and held in mesh with the third racks 114.

Further, as in FIGS. 54 and 60 for example, separate motors 117 for width adjustment are fixed to the outer surfaces of the respective other fixing members 17. The power from these motors 117 is transmitted to the rotation shafts 115 via fourth chains 118. Thus, when the motors 117 are driven independently of each other, the widths of the respective upper and lower carrier regions 15 are changed independently. Instead of the fourth chains 118, other means such as timing belts, gears and the like may be used to transmit the power of the motors.

Referring to FIGS. 59–65, the driving means for the upper and lower shifting units 16 will be described below.

As shown in FIG. 64, the fixing member 17 of each shifting unit 16 has a generally L-shaped cross section. The second shifting member 19 has a channel-like cross section open to the carrier region 15. The upper and the lower ends of the first shifting member 18 are provided with a V-shaped first rail portion 119 and a second rail portion 120, respectively. The first rail portion 119 is located near the fixing member 17, whereas the second rail portion 120 is located near the second shifting member 19. A plurality of first rollers 121 are connected to the fixing member 17 for rotation. The first rollers 121 are fitted into the first rail portion 119. Similarly, a plurality of second rollers 122 are connected to the send shifting member 19 for rotation. The second rollers 122 are fitted into the second rail portion 120. In the present embodiment, the second shifting members 19 are made of a light metal such as aluminium by extrusion. Alternatively, the second shifting members 19 may be made of metal plates.

As shown in FIGS. 56, 61, 62, the both ends of each first shifting member 18 support second sprays 40 for rotation. The second sprockets 40 are coupled via a third chain 41. The third chain 41 is connected at suitable parts to the fixing member 17 and the second shifting member 19.

As shown in FIG. 62, the both ends of the first shifting member 18 are partially removed or cut out (the cut-out portion is indicated by reference 123), so that the third chain 41 is smoothly driven without interference.

As shown in FIGS. 61 and 64, a first rack 25 is fixed to the lower end of the first shifting member 18. The first rack extends substantially along the entire length of the first shifting member 25. The teeth of the rack are faced downward.

As shown in FIGS. 64, 65, a spline shaft 124 is provided to extend below the pair of fixing members 17. The spline shaft 124 is supported by the two fixing members 17 via bearings 125 for rotation. The spline shaft 124 is supported in a non-slidable manner by the non-slidable fixing member 17, whereas supported in a slidable manner by the other slidable fixing member 17.

The spline shaft 124 are fitted into first pinions 30 which are held in mesh with the first racks 25 of the respective fixing members 17. The first pinion 30 held in mesh with the first rack 25 fixed to the non-slidable fixing member 17 is flanked by a pair of bearings 125 so that the pinion 30 is not movable along the spline shaft 124. The other first pinion 30 held in mesh with the first rack 25 fixed to the slidable fixing member 17 is connected to a spline nut 126. The spline nut 126 is fitted into a bearing 125 for rotation. The bearing 125 is fixed to the lower surface of the other fixing member 17.

Thus, one of the fixing members 17 is slidable along the spline shaft 124. Upon rotation of the spline shaft 124, both of first pinions 30 are simultaneously rotated to synchronously reciprocate the shifting members 18, 19.

As shown in FIGS. 54, 57, 63, the power from the motor 20 mounted on the frame 9 is transmitted to the lower spline shaft 124 via a chain 127, whereas the power from the motor 20 mounted on the first reinforcing member 109 is transmitted to the upper spline shaft 124 via a chain 127. To this end, other means such as gears, a timing belt and the like may be used instead of the chain 127. With the arrangement described above, the shifting members 18, 19 on both sides are advantageously synchronized by the solid spline shaft 124. (If a chain is used instead of the spline shaft 124, the desired synchronous movement of the shifting members 18, 19 may not be performed due to possible sagging or expansion of the chain.) Further, when the spline shaft is used, the arrangement for changing the distance between the fixing members 17 is simplified.

Though not shown, to ass the open position and the closed position, the engaging members 45 mounted on the second shifting members 19 are driven by driving means as described in connection to the first and fourth embodiments.

As described above, the carriage 5 is provided with two vertically disposed carrier regions 15. Thus, a single carriage 5 can perform two different shifting operations at different heights, 80 that the operation efficiency is improved. Further, as shown in FIG. 58, the width of the respective two carrier regions 15 can be varied. Thus, the upper and lower carrier regions 15 are suitably used for receiving the objects W having different widths. The upper and lower shifting units 16 may be simultaneously used.

FIGS. 67–69 illustrate the lift 7. As indicated by solid lines in FIG. 69, the lift 7 may be arranged to have one carrier region. Alternatively, as indicated by one-dot chain lines, the lift 7 may have two carrier regions. Though not shown, more than two carrier regions may be possible.

(9) Ninth Embodiment (FIGS. 70–74)

A ninth embodiment will be described below with reference to FIGS. 70–74. A carriage according to this embodiment has one carrier region 15, and the distance between shifting units 16 is arranged to vary. FIG. 70 is a plan view showing the carriage 5. FIG. 71 is a perspective view schematically showing the structure of the carriage 5. FIG. 72 is a perspective view showing part of the structure for adjusting the width between the shifting units 16. FIG. 73 is a perspective view showing the mechanism for driving the shifting members 18, 19. FIG. 74 is a perspective view schematically showing part of the mechanism for driving the shifting units 16.

As shown in FIG. 70, two fixing members 17 are provided, and one of them (first fixing member) that is located closer to a motor 12 for driving the carriage 5 is connected to a movable bracket 129. The bracket 129 is arranged to move relative to the base member 9. On the other hand, the other fixing member 17 (second fixing member) is fixed to the base member 9. Thus, the width of the carrier region 15 is varied by moving the first fixing member 17. In this embodiment, the carrier region 15 is arranged to support side edges of the object W like that of the first embodiment.

As shown in FIGS. 70, 71, 73, a first rack 25 is fixed to each first shifting member 18, and a first pinion 30 is held in mesh with each first rack 25. An idle gear is provided to mesh with the first pinion 30 near the second fixing member 17. The idle gear 30 is provided with a first sprocket 31. The first pinion 30 near the first fixing member 17 is provided with another first sprocket 31.

As shown in FIGS. 70 and 72, a rotation shaft 70 is fitted into the first sprocket 31 near the motor 12, and another rotation shaft 75 is fitted into the idle gear 32. Each of the rotation shafts supports two link members 130 for rotation. Each pair of link members looks like a V as viewed from above, and their free ends are connected for rotation via intermediate shafts 131 (see FIG. 70). As a result, the four link members 130 are connected to form a lozenge. It should be noted that the outer length of the lozenge does not change even when the first fixing member 17 is moved.

The rotation shafts 70, 75 and the intermediate shafts 132 are respectively provided with sprockets 132 which are coupled via a first chain 34. Further, as shown in FIGS. 70, 71, 73, 74, a motor 20 is fixed to the movable bracket 129. The power from the motor 20 is transmitted to the first sprocket 31 near the same motor via a second chain 35.

With such an arrangement, upon rotation of the motor 20, two first pinions 30 are synchronously rotated in the same direction via the second chain 35 and the first chain 34. As a result, the shifting members 18, 19 on both sides are moved forward or backward synchronously. In this regard, even when the distance between the two fixing members 17 is changed, the first chain 34 is prevented from sagging or being longitudinally expanded. This is because, as previously described, the outer length of the lozenge formed by the four link members 130 does not change even when the distance between the two fixing members 17 is changed. Thus, it is possible to reciprocate the shifting members 18, 19 properly regardless of the change in the distance between the two fixing members 17.

As shown in FIGS. 71 and 74, the left and right inner surfaces of the frame 9 support fourth racks 134, respectively, that extend longitudinally of the inner surfaces. The movable bracket 129 supports fourth pinions 135 for rotation. The fourth pinions are held in mesh with the respective fourth racks 134. The power from a width-adjusting motor 117 is transmitted to the pair of fourth pinions 135 via the chain 136 and a plurality of sprockets 137.

In the above arrangement, the chain 136 directly transmits power to the fourth pinion 135 depicted at a left-upper position in FIG. 74, whereas power is transmitted to the other fourth pinion 135 via the idle sprocket 138.

It should be noted that both of the fixing members 17 may be arranged to move.

FIG. 75 shows a modified version of the shelf assembly 2. In this example, the storage compartments 3 are arranged to have different widths L9 so that various objects W differing in width are properly stored in a single shelf assembly 2.

(10) Tenth Embodiment (FIG. 76)

FIG. 76 illustrates an example of arrangements for sliding the movable fixing member 17. In this embodiment, a slider 139 is fitted around the base frame 9 for sliding movement. The slider 139 supports the fixing member 17.

(11) Eleventh Embodiment (FIG. 77)

FIG. 77 illustrates an example of arrangements for moving the fixing member 17. Specifically, both of the fixing members 17 are mounted on the base frame 9 for horizontal movement. Each fixing member 17 is provided with a block 140 through which a threaded through hole extends. A screw shaft 141 having threaded portions is fitted into the blocks 140 and held in mesh with the blocks. In this state, the screw shaft 141 extends in the moving direction of the carriage 5. The screw shaft 141 is rotated by a width-adjusting motor 117.

In the above arrangement, the spiral directions of the treads corresponding to the respective blocks 140 are opposite. As a result, upon rotation of the screw shaft 141, the two blocks 140 are moved toward or away from each other.

(13) Thirteenth Embodiment (FIG. 78)

FIG. 78 illustrates an example of carrier region 15. According to this embodiment, the carriage 5 includes a base plate 142 on which a pair of shifting units 16 are mounted. It is arranged that at least one of the shifting units 16 is movable.

FIGS. 79–94 illustrate an example of arrangements of the shelf assembly 2. FIG. 79 is a plan view of the shelf assembly 2. FIG. 80 is a sectional plan view showing the structure of the shelf assembly 2. FIGS. 81 and 82 are exploded perspective views showing principal parts. FIG. 83 is a sectional view taken along lines 83—83 in FIG. 81. FIG. 84 is an exploded perspective view showing the fixing arrangement of the rail. FIG. 85 is a sectional view taken along lines 87—87 in FIG. 78. FIG. 86 is a sectional view showing a shelf in a fixed state. FIG. 87 is a sectional view taken along lines 87—87 in FIG. 79. FIG. 88 is a sectional view taken along lines 88—88 in FIG. 86. FIG. 89 is a sectional view taken along lines 89—89 in FIG. 79. FIG. 90 is a plan view near supporting posts. FIG. 91 is a sectional view taken along lines 91—91 in FIG. 86. FIG. 92 is a sectional view taken along lines 92—92 in FIG. 91. FIGS. 93 and 94 illustrate examples of arrangements of shelf assembly 2.

As shown in FIG. 79, the shelf assembly 2 includes front and rear vertical supporting posts 144, 145 disposed in the moving direction of the carriage 5. A unit storage area is described as a space defined by two front supporting posts 144 and two rear supporting posts 145. Each unit storage area includes a plurality of shelf plates 62 disposed adjacently.

As shown in FIGS. 81 and 85 for example, the shelf plate 62 is a shallow box-like member open downward. The front edge of the shelf plate 62 is formed with a front leg piece 61a projecting downward and having an L-shaped cross section. The front leg piece 61a is supported by a step portion 4a of a tracking rail 4.

As shown in FIGS. 80 and 84, the tracking rails 4 are connected to the front supporting post 144 by bolts 147. More specifically, one tracking rial 4 is arranged between two adjacent front supporting posts 144. In other words, two adjacent tracking rails 4 are bridged by one front supporting post 144. Each end of the tracking rail 4 is formed with a positioning piece 148 (see FIG. 84), while the front surface of a supporting post 144 is formed with two positioning holes 149. The positioning piece 148 of the rail 4 is inerted into a corresponding one of the positioning holes 149. In this state, the tracking rail 4 is connected to the supporting post 144 by a bolt 147. With such an arrangement, the distance between two adjacent front supporting posts 144 is automatically set by the tracking rail 4, so that the shelf assembly is easily put together. Alternatively, the tracking rail 4 may be supported by more than two front supporting posts 144, some intermediate portions of the rail 4 are connected to the additional supporting posts 144.

The rear edge of each shelf plate 62 is supported by a rear supporting member 150 made of metal. The supporting member 150 extends in the longitudinal direction of the tracking rail 4. The rear supporting member 150 and the tracking rail 4 are the same in length. As shown in FIG. 80, the end of the rear supporting member 150 is connected to the rear supporting post 144 by a bolt 151.

As shown in FIGS. 81, 85, 86, the rear supporting member 150 is formed with a forwar opening groove 152 open to the tracking rail 4. The rear edge of the shelf plate 62 is inserted into the forward opening groove 152.

The forward opening groove 152 of the rear supporting member 150 is formed so that a suitable clearance 153 is provided between the upper surface of the supporting member 150 and the upper surface of the shelf plate 62. The rear end of the fixing piece 154 bridging between the adjacent shelf plates 62 is firmly fitted into the clearance 153. Thus, it is possible to prevent each shelf plate 62 from being vertically displaced. The fixing piece 154 is also used as a partition dividing a space above the shelf plate 62. The upper end of the rear supporting member 150 is formed with an upwardly projecting stopper piece 155 for preventing the object W from falling off.

As shown in FIGS. 79, 81, 82 for example, the fixing piece 154 extends in the shifting direction of the object W. Both of the longitudinal edges of the fixing piece are formed with upwardly projecting guide pieces 156 to prevent lateral deviation of the object W. The front ends 156a of the respective guide pieces 156 are inclined in a converging manner.

As shown in FIGS. 82 and 83, the bottom surface of the fixing piece 154 is formed with a plurality of pairs of engaging nails 157. The pairs of engaging nails 157 are spaced from each other longitudinally of the fixing piece 154. In each pair, as best shown in FIG. 83, two engaging nails 157 are arranged symmetrically with the longitudinal center line of the fixing piece 154 and point to each other.

On the other hand, the side edges of each shelf plate 62 are formed with engaging bores 158 corresponding to the engaging nails 157. As shown in FIG. 82, the engaging bore 158 of the shelf plate 62 includes a wider portion 158a for inserting and drawing out the engaging nail 157, and a narrower portion 158b for catching the engaging nail 157.

In the above arrangement, adjacent self plates 62 are advantageously fixed to each other in the following manner. First the engaging nails 157 of the fixing piece 154 are inserted from above into the wider portions 157a of the engaging bores 158 of the respective shelf plates 62. Then, the fixing piece 154 is longitudinally slided so that the engaging nails 157 are brought into unreleasable engagement with the narrower portions 158b of the engaging bores 158. At the same time, the rear end of the fixing piece 154 is fitted into the forward opening groove 152 of the rear supporting member 150. As a result, the two adjacent shelf plates 62 are connected to each other and to the fixing piece 154.

As shown in FIGS. 82 and 84, the bottom surface of the fixing piece 154 is formed with a plurality of joggles 159 projecting downward. Each joggle 159 is offset from a corresponding engaging nail 157 toward the front end of the fixing piece 154. When the fixing piece 154 is fully slided toward the rear supporting member 150 as shown in FIG. 89, the joggles 159 will fall into the corresponding engaging bores 158 of the shelf plate 62. In this state, the fixing piece 154 is advantageously prevented from moving forward and consequently coming off the shelf plates 62.

As shown in FIGS. 90, 91, 92, the fixing piece 154 used at an end portion of the storage area is arranged to have its side surface contacted by the front and the rear supporting posts 144. Further, the same fixing piece 154 is arranged so that it half portion defined by the longitudinally extending center line is overlapped by the shelf plate 62. In other words, as shown in FIG. 92, a clearance is provided between the shelf plate 62 and the post 144. The reason why such a clearance is provided is to make it possible to use, for the post 144, the same fixing piece 154 having the pairs of gaging nails 157.

With the above arrangement of the shelf assembly 2, the fixing of the shelf plate 62 is remarkabley simply performed. Specifically, first the rear end of the shelf plate 62 is inserted into the forward opening groove 152 of the rear supporting member 150, and the front end of the shelf plate 62 is fell down to the step portion 4a of the tracking rail 4. Then, as shown in FIG. 84 the fixing piece 154 is slided toward the rear supporting member 150, while the fixing piece 154 is held in contact with the upper surface of the shelf plate 62. Such an operation is remarkably easily performed. Thus, the shelf assembly 2 is efficiently assembled.

Further, the use of the fixing piece 154 makes it possible for the rear supporting member 150 to slightly deflect against elasticity. The resulting elastic restoring force serves to properly fix each shelf plate 62 without rendering the shelf plate unstable.

In the above embodiment, the fixing pieces 154 at the corners of the storage area are arranged to come into contact with a side surface of the supporting post 144. In this way, the shelf plate 62 can be reliably fixed, and only one type of the shelf plate 62 and the fixing piece 154 is needed. Further, with an arrangement where the rear log piece 61a of the shelf plate 62 is fitted into a fitting portion 150a of the rear supporting member 150, the shelf plates 62 are reliably prevented from positionally deviating, while their strength is improved.

FIGS. 93 and 94 illustrate other possible porting arrangements of the shelf plate 62 by the rear supporting member 150.

We claim:

1. A carriage for a storage-retrieval system including a shelf assembly, the carriage comprising:

a base member;

at least one carrier region provided above the base member for supporting an object to be transferred;

at least one pair of shifting units flanking the carrier region, the shifting units being reciprocally movable into and away from the shelf assembly;

engaging members mounted on the shifting units, each of the engaging members including a base portion while being arranged to pivot about a vertical axis and movable between a closed position for contacting with the object and an open position for avoiding contacting with the object; and locking means for holding the engaging members in the closed position, the locking means being formed into a wedge to be releasably inserted between the base portion of a corresponding engaging member in the closed position and a corresponding shifting unit.

2. The carriage according to claim 1, further comprising driving means for moving the engaging members, the driving means being mounted on the shifting units.

3. The carriage according to claim 1, wherein said each shifting unit includes a first shifting member movable relative to the base member and a second shifting member movable relative to the first shifting member, the second shifting member being elongated in the reciprocating direction of said each shifting unit, the second shifting member having longitudinally spaced ends at least one of which is provided with one of the engaging members.

4. The carriage according to claim 1, wherein said each engaging member is reciprocally movable relative to a corresponding shifting unit by a predetermined distance in a longitudinal direction of the corresponding shifting unit.

5. The carriage according to claim 4, wherein said each engaging member assumes the closed position when said each engaging member comes to an extremity of the reciprocal movement relative to the corresponding shifting unit.

6. The carriage according to claim 1, comprising more than one carrier region for carrying objects and more than one pair of shifting units opposite to each other across the respective carrier portions.

7. The carriage according to claim 1, wherein a distance between the shifting units is variable.

8. The carriage according to claim 1, wherein a spline shaft is rotatably mounted below the carrier portion, the spline shaft being connected to the shifting units to transmit driving force so that the shifting units are synchronously reciprocated.

9. The carriage according to claim 1, wherein the shifting units are provided with a sensor for detecting an object present at the carrier region or the shelf assembly during the reciprocating movement.

10. The carriage according to claim 9, wherein the carrier region of the carriage is scanned by the sensor while the shifting units are moved toward the shelf assembly, the shifting units being arranged to stop when the sensor detects an obstacle at the carrier region.

11. The carriage according to claim 9, wherein the shifting units are moved to measure a length of the abject by the sensor, a subsequent shifting operation for the object being performed based on the length of the object.

12. The carriage according to claim 9, wherein the shifting units are moved to detect the object by the sensor, the engaging members being arranged to decelerate based on the detection immediately before the engaging members come into engagement with the object, the engaging members being arranged to accelerate immediately after the engaging members engage the object.

* * * * *